US011763668B2

(12) United States Patent
Ghafarianzadeh et al.

(10) Patent No.: US 11,763,668 B2
(45) Date of Patent: *Sep. 19, 2023

(54) DETECTING BLOCKING OBJECTS

(71) Applicant: Zoox, Inc., Foster City, CA (US)

(72) Inventors: Mahsa Ghafarianzadeh, Emerald Hills, CA (US); Benjamin John Sapp, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 17/210,325

(22) Filed: Mar. 23, 2021

(65) Prior Publication Data
US 2021/0208598 A1 Jul. 8, 2021

Related U.S. Application Data

(63) Continuation of application No. 15/897,028, filed on Feb. 14, 2018, now Pat. No. 10,955,851.

(51) Int. Cl.
*G08G 1/01* (2006.01)
*B60K 31/00* (2006.01)
(Continued)

(52) U.S. Cl.
CPC ....... *G08G 1/0145* (2013.01); *B60K 31/0008* (2013.01); *G05D 1/0221* (2013.01);
(Continued)

(58) Field of Classification Search
USPC ......................................................... 701/23
See application file for complete search history.

(56) References Cited

U.S. PATENT DOCUMENTS 5,177,685 A 1/1993 Davis et al.
6,272,072 B1 8/2001 Wulich et al.
(Continued)

FOREIGN PATENT DOCUMENTS

CA 2474443 A1 8/2003
CN 103069153 A 4/2013
(Continued)

OTHER PUBLICATIONS

Japanese Office Action dated Feb. 1, 2022 for Japanese Patent Application No. 2019-547445, a foreign counterpart to U.S. Pat. No. 10,353,390, 13 pages.
(Continued)

*Primary Examiner* — Tyler D Paige
(74) *Attorney, Agent, or Firm* — Lee & Hayes, P.C.

(57) ABSTRACT

A method and system of determining whether a stationary vehicle is a blocking vehicle to improve control of an autonomous vehicle. A perception engine may detect a stationary vehicle in an environment of the autonomous vehicle from sensor data received by the autonomous vehicle. Responsive to this detection, the perception engine may determine feature values of the environment of the vehicle from sensor data (e.g., features of the stationary vehicle, other object(s), the environment itself). The autonomous vehicle may input these feature values into a machine-learning model to determine a probability that the stationary vehicle is a blocking vehicle and use the probability to generate a trajectory to control motion of the autonomous vehicle.

20 Claims, 8 Drawing Sheets

(51) Int. Cl.
  *G05D 1/02*    (2020.01)
  *G06N 20/00*   (2019.01)
  *G08G 1/16*    (2006.01)
  *G06V 20/58*   (2022.01)
  *G06F 18/243*  (2023.01)
  *G06N 7/01*    (2023.01)
  *G06V 10/764*  (2022.01)

(52) U.S. Cl.
  CPC ......... *G06F 18/24323* (2023.01); *G06N 7/01* (2023.01); *G06N 20/00* (2019.01); *G06V 10/764* (2022.01); *G06V 20/58* (2022.01); *G08G 1/165* (2013.01)

(56) References Cited

U.S. PATENT DOCUMENTS

| | | | |
|---|---|---|---|
| 6,707,421 | B1 | 3/2004 | Drury et al. |
| 8,112,225 | B2 | 2/2012 | Eidehall et al. |
| 8,121,749 | B1 | 2/2012 | Agrawal et al. |
| 8,473,447 | B2 | 6/2013 | Yoon et al. |
| 8,620,517 | B2 | 12/2013 | Caveney et al. |
| 8,645,310 | B2 | 2/2014 | Jiang et al. |
| 8,849,494 | B1* | 9/2014 | Herbach .............. G05D 1/0297 701/24 |
| 8,880,272 | B1 | 11/2014 | Ferguson et al. |
| 8,996,224 | B1* | 3/2015 | Herbach .............. G05D 1/0027 701/25 |
| 9,008,890 | B1* | 4/2015 | Herbach ................ G07C 5/008 340/436 |
| 9,368,026 | B1 | 6/2016 | Herbach |
| 9,381,916 | B1 | 7/2016 | Zhu et al. |
| 9,495,874 | B1 | 11/2016 | Zhu et al. |
| 9,507,347 | B1 | 11/2016 | Ogale et al. |
| 9,558,659 | B1 | 1/2017 | Silver et al. |
| 9,568,915 | B1 | 2/2017 | Berntorp et al. |
| 9,612,123 | B1 | 4/2017 | Levinson et al. |
| 10,059,334 | B1 | 8/2018 | Zhu et al. |
| 10,061,322 | B1 | 8/2018 | Palefsky-Smith |
| 10,387,736 | B2 | 8/2019 | Wang et al. |
| 10,514,697 | B2* | 12/2019 | Wisniowski ........... G01C 21/20 |
| 10,955,851 | B2* | 3/2021 | Ghafarianzadeh ....... G06N 7/01 |
| 2003/0187578 | A1 | 10/2003 | Nishira et al. |
| 2005/0049785 | A1 | 3/2005 | Vergin |
| 2011/0125344 | A1 | 5/2011 | An et al. |
| 2011/0205042 | A1 | 8/2011 | Takemura et al. |
| 2014/0324268 | A1 | 10/2014 | Montemerlo et al. |
| 2015/0147936 | A1 | 5/2015 | Hornsby et al. |
| 2016/0201934 | A1 | 7/2016 | Hester et al. |
| 2017/0031361 | A1 | 2/2017 | Olson et al. |
| 2017/0111262 | A1 | 4/2017 | Imai |
| 2017/0131719 | A1 | 5/2017 | Micks et al. |
| 2017/0192423 | A1* | 7/2017 | Rust ..................... G05D 1/0238 |
| 2017/0192426 | A1 | 7/2017 | Rust |
| 2017/0192437 | A1 | 7/2017 | Bier et al. |
| 2017/0193338 | A1 | 7/2017 | Huberman et al. |
| 2017/0213459 | A1 | 7/2017 | Ogaz |
| 2017/0277195 | A1 | 9/2017 | Frazzoli et al. |
| 2017/0364758 | A1 | 12/2017 | Minster |
| 2018/0068191 | A1 | 3/2018 | Biemer et al. |
| 2018/0089563 | A1 | 3/2018 | Redding et al. |
| 2018/0095465 | A1 | 4/2018 | Gao et al. |
| 2018/0137380 | A1 | 5/2018 | Alrefai et al. |
| 2018/0141544 | A1 | 5/2018 | Xiao et al. |
| 2018/0144202 | A1 | 5/2018 | Moosaei et al. |
| 2018/0148051 | A1 | 5/2018 | Lujan et al. |
| 2018/0164816 | A1 | 6/2018 | Hashimoto et al. |
| 2018/0224860 | A1 | 8/2018 | Warshauer-Baker et al. |
| 2018/0251126 | A1 | 9/2018 | Linscott et al. |
| 2019/0025841 | A1* | 1/2019 | Haynes ................ G05D 1/0214 |
| 2019/0051069 | A1 | 2/2019 | Cooley |
| 2019/0061765 | A1 | 2/2019 | Marden et al. |
| 2019/0092318 | A1 | 3/2019 | Mei et al. |
| 2019/0101919 | A1 | 4/2019 | Kobilarov et al. |
| 2019/0122059 | A1 | 4/2019 | Zhou et al. |
| 2019/0244058 | A1 | 8/2019 | Franca-Neto |
| 2019/0250626 | A1 | 8/2019 | Ghafarianzadeh et al. |
| 2019/0272750 | A1 | 9/2019 | Fukumoto et al. |
| 2019/0308620 | A1 | 10/2019 | Sapp et al. |
| 2019/0329769 | A1 | 10/2019 | Shalev-Shwartz et al. |
| 2019/0344804 | A1 | 11/2019 | Motomura et al. |
| 2019/0354786 | A1 | 11/2019 | Lee et al. |
| 2019/0359208 | A1 | 11/2019 | Sapp et al. |
| 2019/0361443 | A1 | 11/2019 | Linscott et al. |
| 2019/0384294 | A1 | 12/2019 | Shashua et al. |
| 2020/0086855 | A1 | 3/2020 | Packer et al. |
| 2020/0110416 | A1 | 4/2020 | Hong et al. |
| 2020/0160530 | A1 | 5/2020 | Mehnert et al. |
| 2020/0387158 | A1 | 12/2020 | Kobilarov et al. |

FOREIGN PATENT DOCUMENTS

| | | |
|---|---|---|
| CN | 203032675 | 7/2013 |
| CN | 106382942 A | 2/2017 |
| CN | 107015559 A | 8/2017 |
| EP | 3217332 | 9/2017 |
| GB | 2547082 | 8/2017 |
| JP | 2006146889 | 6/2006 |
| JP | 2008129804 A | 6/2008 |
| JP | 2008225579 | 9/2008 |
| JP | 2015516623 | 6/2015 |
| JP | 2016191975 | 11/2016 |
| JP | 2016210255 A | 12/2016 |
| WO | WO2016062568 A1 | 4/2016 |
| WO | WO2016130719 | 8/2016 |
| WO | WO2017091690 | 6/2017 |

OTHER PUBLICATIONS

Office Action for U.S. Appl. No. 16/512,195, dated Jul. 21, 2021, Linscott, "Trajectory Generation and Execution Architecture", 9 pages.

Office Action for U.S. Appl. No. 16/908,389, dated Oct. 29, 2021, Kobilarov, "Trajectory Generation Using Temporal Logic and Tree Search", 7 Pages.

Office Action for U.S. Appl. No. 16/512,195, dated Dec. 17, 2021, Linscott, "Trajectory Generation and Execution Architecture", 10 pages.

Chinese Office Action dated Sep. 30, 2022 for Chinese Patent Application No. 201880015297.5, a foreign counterpart to U.S. Pat. No. 10,353,390, 35 pages.

Saha, S.K., "Introduction to Robotics", 2008, pp. 225-226.

Office Action for U.S. Appl. No. 16/512,195, dated Apr. 11, 2022, Linscott, "Trajectory Generation and Execution Architecture", 15 Pages.

U.S. Appl. No. 15/632,208, filed Jun. 23, 2017, Linscott, et al., "Trajectory Generation and Execution Architecture", 63 pages.

Anonymous "Outline of machine learning—Wikipedia", Mar. 27, 2018, Retrieved from the Internet: URL:https://en.wikipedia.org/w/index.php?title=Outline of machine learning&oldid=832722436, retrieved on Jul. 9, 2019, section entitled "Machine learning methods", 28 pages.

Broadhurst et al., "Monte Carlo Road Safety Reasoning", Proc IEEE Intelligent Vehicles Symposium, Jun. 2005, 6 pgs.

Gu et al, "On-Road Motion Planning for Autonomous Vehicles", Proc 5th intl conf on Intelligent Robotics and Applications, vol. Part III, ICIRA Oct. 2012, 10 pgs.

Heinemann, "Predicting Cut-Ins in Traffic Using a Neural Network", Master's thesis in Systems, Control and Mechatronics, Jan. 1, 2017, Retrieved from the Internet: URL:https://pdfs.semanticscholar.org/be17/0747667db2db224ccbe3f909ad99de14c78a.pdf [retrieved on Jul. 9, 2019], section 5.1 & 6, pp. 9-11.

McMahon et al., "Sampling-Based Tree Search with Discrete Abstractions for Motion Planning with Dynamics and Temporal Logic", IEEE/RSJ Intl Conf on Intelligent Robots and Systems, Sep. 2014, 9 pgs.

Final Office Action dated Mar. 2, 2020 for U.S. Appl. No. 16/536,228 "Feature-Based Prediction", Sapp, 6 pages.

(56) References Cited

OTHER PUBLICATIONS

Non Final Office Action dated Aug. 13, 2020 for U.S. Appl. No. 15/982,658, "Vehicle Lighting State Determination", Lee, 33 pages.
Non Final Office Action dated Sep. 9, 2020 for U.S. Appl. No. 16/536,228, "Feature-Based Prediction", Sapp, 7 pages.
Office Action for U.S. Appl. No. 15/833,715, dated Oct. 2, 2019, Kobilarov et al., "Trajectory Prediction of Third-Party Objects Using Temporal Logic and Tree Search", 12 pages.
Office Action for U.S. Appl. No. 16/193,801, dated Oct. 24, 2019, Kobilarov, "Trajectory Generation Using Temporal Logic and Tree Search", 8 pages.
Non Final Office Action dated Dec. 16, 2019 for U.S. Appl. No. 15/982,658 "Vehicle Lighting State Determination" Lee, 30 pages.
Office Action for U.S. Appl. No. 15/982,658, dated Feb. 3, 2021, Lee, "Vehicle Lighting State Determination", 32 pages.
Final Office Action dated Apr. 27, 2020 for U.S. Appl. No. 15/982,658 "Vehicle Lighting State Determination" Lee, 32 pages.
Office Action for U.S. Appl. No. 15/632,147, dated Apr. 30, 2018, Kobilarov et al., "Trajectory Generation Using Temporal Logic and Tree Search", 6 pages.
Non Final Office Action dated May 18, 2020 for U.S. Appl. No. 15/897,028 "Detecting Blocking Objects" Ghafarianzadeh, 21 pages.
Office Action for U.S. Appl. No. 16/536,228, dated Sep. 26, 2019, Sapp et al., "Feature-Based Prediction", 6 pages.
PCT Invitation to Pay Additional Fees mailed Jun. 6, 2018 for PCT application No. PCT/US2018/019685, 12 pages.
PCT Search Report and Written Opinion dated Jul. 17, 2019, for PCT Application No. PCT/US2019/025226, 13 pages.
PCT Search Report and Written Opinion dated Apr. 15, 2019, for PCT Application No. PCT/US2019/016407, 11 pages.
PCT Search Report and Written Opinion dated Jul. 30, 2018, for PCT Application No. PCT/US18/19685, 17 pages.
PCT Search Report and Written Opinion dated Aug. 22, 2019 for PCT Application No. PCT/US2019/031057, 8 pages.
Wongpiromsarn et al., "Receding Horizon Temporal Logic Planning", IEEE Transactions on Automatic Control, vol. 57, Issue 11, Nov. 2012, 14 pgs.
Japanese Office Action dated Jul. 5, 2022 for Japanese Patent Application No. 2019-547445, a foreign counterpart to U.S. Pat. No. 10,353,390, 4 pages.
European Office Action dated Oct. 28, 2022 for European Patent Application 19706098.1 a foreign counterpart to U.S. Pat. No. 10,955,851 5 pages.
Translated Japanese Office Action dated Jan. 17, 2023, for Japanese Patent Application No. 2020-543277, a foreign counterpart to U.S. Pat. No. 10,955,851, 17 pages.
Office Action for U.S. Appl. No. 16/512,195, dated Sep. 8, 2022, Linscott, "Trajectory Generation and Execution Architecture", 15 pages.
Chinese Office Action dated Mar. 8, 2023, for Chinese patent application No. 201980013149.4, a foreign counterpart for U.S. Pat. No. 10,955,851, 16 pages.
Chinese Office Action dated Apr. 8, 2023 for Chinese Patent Application No. 201880015297.5, a foreign counterpart to U.S. Pat. No. 10,353,390, 25 pages.
Japanese Office Action dated Feb. 14, 2023 for Japanese patent application No. 2019-547445, a foreign counterpart of U.S. Pat. No. 10,353,390, 8 pages.

* cited by examiner

DETECTING BLOCKING OBJECTS

RELATED APPLICATIONS

This application claims priority to U.S. patent application Ser. No. 15/897,028, filed Feb. 14, 2018, which is incorporated herein by reference for all purposes.

BACKGROUND

Stationary objects, such as vehicles on a road, may interfere with autonomous operation of a vehicle. For example, a stationary vehicle in front of the autonomous vehicle may be double-parked, or otherwise incapacitated, blocking the autonomous vehicle. Detecting such blocking vehicles may be limited by sensor visibility, as it may be impossible to "see" in front of the potentially blocking vehicle to determine if it is a blocking vehicle.

Furthermore, environmental cues may add to complexity of detection. To enumerate two examples, a vehicle stopped at an intersection having a detected red light may be a blocking vehicle and not waiting on the traffic light. Similarly, a vehicle stopped near an intersection having a detected green light may, in fact, be waiting in a long line to make a turn and not be a blocking vehicle. Operating autonomously based on improperly detected blocking vehicles may create additional problems, such as the inability for the autonomous vehicle to re-enter its original lane.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1A:
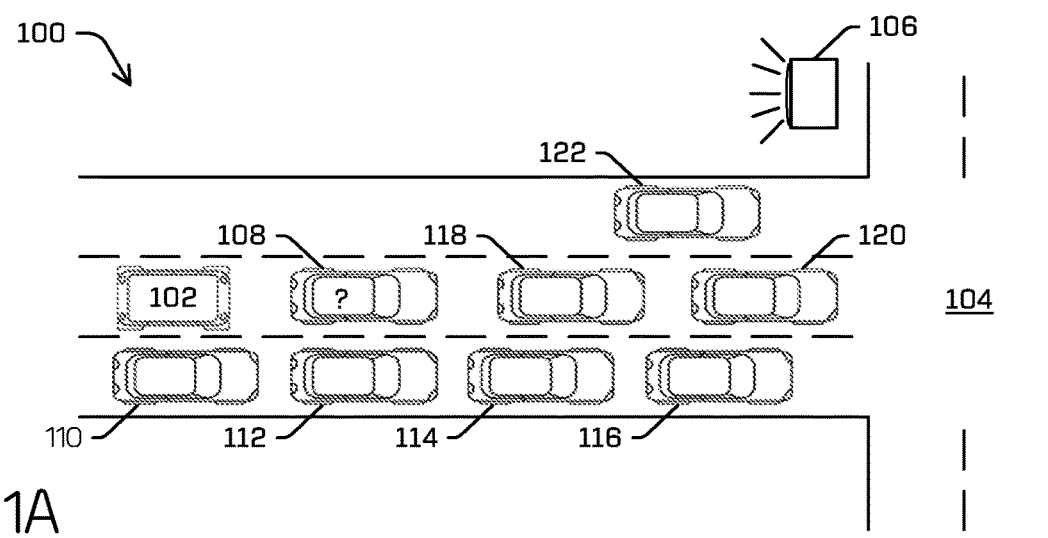
FIG. 1A illustrates an example scenario involving a stationary vehicle that may be a blocking vehicle.

As above, blocking objects (including vehicles) include objects which impede an autonomous vehicle from proceeding along a planned route or path. For example, in many urban environments, double parking is a common practice. Such double-parked vehicles need to be detected as blocking vehicles to be treated separately from stationary vehicles. Particularly, while the autonomous vehicle may be instructed to wait for a stopped vehicle to move, the autonomous vehicle may be instructed to navigate around such a double-parked vehicle. General rules, such as treating all stationary vehicles at green lights as blocking, are often inaccurate and/or insufficient for operating the autonomous vehicle safely and/or in a manner that more closely mimics human operation of a vehicle. This disclosure is generally directed to techniques (e.g., machines, programs, processes) for determining whether a stationary vehicle is a blocking vehicle, or object, in order to control an autonomous vehicle in light of this determination. In some examples, the techniques discussed herein include a machine-learning (ML) model configured to receive sensor data to determine whether to indicate that a stationary vehicle is a blocking vehicle. Instead of making this determination according to a conditional rule (e.g., if it is true that a light is green and it is true that the vehicle is stopped, indicate that the vehicle is a blocking vehicle), the techniques discussed herein may determine a probability that a stationary vehicle is a blocking vehicle, using an ML model that takes sensor data as input.

In some examples, techniques discussed herein may include receiving raw and/or processed sensor data (e.g., sensor data processed by another machine-learning model and/or software/hardware module of the autonomous vehicle) from sensor(s) and/or software and/or hardware modules of an autonomous vehicle, determining that a vehicle in a path of the autonomous vehicle is stationary, determining feature values from the sensor data (e.g., values indicating features such as a distance to the next junction in the roadway; a distance from the stationary vehicle to a next vehicle in front of the stationary vehicle; speed, brake light conditions, height, size, and/or yaw of the stationary vehicle; a classification of the stationary vehicle and/or object(s) in the vicinity of the stationary vehicle; traffic flow data), and determining a probability that the stationary vehicle is a blocking vehicle. In some examples, the probability may be determined using an ML model.

In some examples, the autonomous vehicle may include a perception engine and/or a planner for controlling the autonomous vehicle. The perception engine may include one or more ML models and/or other computer-executable instructions for detecting, identifying, classifying, and/or tracking objects from sensor data collected from the environment of the autonomous vehicle. In some examples, the perception engine may include the ML model configured to determine a probability that the stationary vehicle is a blocking vehicle (referenced hereinafter as the "BV model," although general discussion of ML models equally applies to the BV model). The planner may include one or more ML models, algorithms, etc. for route-planning, trajectory-planning, evaluating decisions, etc. The planner may be configured to generate a trajectory for controlling motion of the autonomous vehicle from data received from other components of the autonomous vehicle such as, for example, the perception engine, sensor(s), data received from other vehicles and/or a network connection, a global and/or local map component, etc.

The techniques discussed herein improve operation of an autonomous vehicle by increasing accuracy of detections over prior solutions (e.g., using conditional rules). Practically, the techniques result in preventing the autonomous vehicle from unnecessarily sitting behind a blocking vehicle, which consequently reduces power consumption and wasted compute cycles by the vehicle. The techniques may also prevent the autonomous vehicle from unnecessarily changing lanes or re-routing when the stationary vehicle is a non-blocking stationary vehicle. This may similarly reduce power consumption and wasted compute cycles by the vehicle. The techniques may also improve safety of the autonomous vehicle's operation both to passengers of the autonomous vehicle and/or to entities of the environment by more accurately perceiving a situation. For example, the techniques may prevent the autonomous vehicle from lane-changing only to have to return to the original lane that is occupied by a line of cars not previously perceived by the autonomous vehicle (e.g., which may present an increased collision hazard), encountering an object that the non-blocking stationary vehicle had paused for, anticipating that door(s) of the non-blocking stationary vehicle may open and avoiding hitting them, etc.

As used herein, a blocking vehicle is a stationary vehicle on a drivable surface that impedes other vehicles from making progress in some manner. Not all stationary vehicles on drivable surfaces are blocking vehicles. For example, a non-blocking stationary vehicle may be a vehicle that has paused its progress on a drivable road surface for a traffic light signaling a red light, to yield to another vehicle and/or to wait for another vehicle to make progress, for an object that crosses in front of the vehicle, etc. In contrast, a blocking vehicle may be a double-parked vehicle, a delivery truck that has been parked to make a delivery, a vehicle that a driver vacated, a stopped police car, an incapacitated vehicle, etc. The difference between a non-blocking stationary vehicle and a blocking vehicle may be ambiguous and difficult to determine since, in most cases, the difference may be only a matter of length of time for which the stationary vehicle is stopped. However, the primary difference between a stationary vehicle and a blocking vehicle is that progress of a vehicle would otherwise be possible and/or permitted but for the existence of the blocking vehicle. In some examples, the blocking vehicle may be categorized as a stationary vehicle which is not obeying generally accepted rules of the road, such as proceeding along a lane. The techniques discussed herein improve operation of autonomous vehicles by preventing the autonomous vehicle from stopping behind a blocking vehicle for an untenable duration of time.

Example Scenario

FIG. 1A is a schematic aerial view of an example scenario 100 that illustrates one instance of many for which techniques discussed herein may be applied. In the example scenario, an autonomous vehicle 102 approaches a roadway junction 104 that includes a traffic light 106. In some examples, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification now in existence or developed in the future. Moreover, in some examples, the techniques described herein for determining blocking vehicles may be usable by non-autonomous vehicles as well.

The autonomous vehicle 102 may receive sensor data from one or more sensors of the autonomous vehicle 102. The autonomous vehicle 102 may use this sensor data to determine a trajectory for controlling motion of the autonomous vehicle. In some examples, the autonomous vehicle 102 may include a planner that receives a data from the sensor(s) and/or a perception engine, among other hardware and software modules. For example, this data may include a position of the autonomous vehicle 102 determined by a global-positioning system (GPS) sensor, data related to objects in the vicinity of the autonomous vehicle 102, route data that specifies a destination of the vehicle, global map data that identifies characteristics of roadways (e.g. features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The planner may use this data to generate a trajectory for controlling motion of the vehicle. In some examples, the autonomous vehicle 102 may include a perception engine that receives sensor data from one or more sensors of the vehicle 102, determines perception data from the sensor data, and transmits the perception data to the planner for use by the planner to localize a position of the autonomous vehicle 102 on the global map, determine one or more trajectories, and control motion of the autonomous vehicle 102 to traverse a path or route. For example, the planner may determine a route for the autonomous vehicle 102 from a first location to a second location, generate potential trajectories for controlling motion of the autonomous vehicle 102 for windows of time (e.g., 1 microsecond, half a second) to control the vehicle to traverse the route, and select one of the potential trajectories as a trajectory of the autonomous vehicle 102 that may be used to generate a drive control signal that may be transmitted to drive components of the autonomous vehicle 102.

The perception engine may include one or more ML models and/or other computer-executable instructions for detecting, identifying, segmenting, classifying, and/or tracking objects from sensor data collected from the environment of the autonomous vehicle 102. For example, the perception engine may detect an object in the environment and classify the object (e.g., passenger vehicle, semi-truck, pickup truck, human, child, dog, ball). The perception engine may also determine a track of the object (e.g., historical, current, and/or predicted heading, position, velocity, and/or acceleration of the object).

The perception engine may determine that a vehicle is a stationary vehicle based, at least in part, on sensor data received from one or more sensors of the autonomous vehicle. In some examples, the perception engine may receive sensor data and, based, at least in part, on the sensor data detect an object in the environment of the autonomous vehicle 102, classify that object as some type of vehicle, and determine that the sensor data indicates that a velocity of the detected vehicle does not exceed a predetermined threshold velocity (e.g., a sensed velocity of the vehicle is not greater than or equal to 0.1 meters per second or 0.05 meters per second). As used herein a vehicle may be, for example and without limitation, a means of physical transportation such as a passenger vehicle, a delivery truck, a bicycle, a drone for transporting objects, etc. In some examples, the perception engine may classify the detected vehicle as a stationary vehicle based on a determination that a velocity of the stationary vehicle does not satisfy (e.g. meet, exceed) a predetermined threshold velocity and/or that another condition is satisfied such as, for example, a duration of time, a traffic light condition, a sensed distance from a junction satisfies a predetermined threshold distance, etc. For example, the perception engine may classify a detected vehicle as a stationary vehicle based, at least in part, on receiving sensor data it determines to be indicative of the detected vehicle going slower than a predetermine threshold velocity (e.g., the vehicle is stopped) and that the vehicle has been going slower than the predetermined threshold velocity for a predetermined amount of time (e.g., the vehicle has been stopped for 20 seconds) while a traffic light indicates a green light and/or at a distance of 100 meters from the junction.

Returning to the example scenario in FIG. 1A, the autonomous vehicle 102 may approach a junction 104 that includes a traffic light 106 and may encounter an object that it classifies as a stationary vehicle (e.g., vehicle 108), which is also indicated with a question mark in the illustration. The technical difficulty that arises is when the perception engine does not have sufficient information to know whether the stationary vehicle is merely paused (i.e., a non-blocking stationary vehicle), being itself obstructed by another object and/or legal constraint (e.g., a stop light), or whether the stationary vehicle is actually a blocking vehicle. As used herein, a blocking vehicle is a vehicle on a drivable road surface that is stopped or moving at a velocity less than a predetermined threshold velocity that impedes progress of other vehicles. For example, a blocking vehicle might be a double-parked vehicle, a delivery truck from which goods are being unloaded, a vehicle that a driver vacated or whose driver is waiting to pick up passengers, a stopped police car, an incapacitated vehicle (e.g., a vehicle that has a failed drive system, a vehicle with a flat tire, a vehicle involved in a vehicle accident, a vehicle whose occupant has vacated the vehicle), or a meter-reading patrol vehicle. As used herein a "drivable road surface" may include those portions associated with a roadway associated with normative driving conditions, as opposed to a non-drivable road surface, such as a shoulder, parking lane, and/or a bike lane.

A blocking vehicle may be different than a non-blocking stationary vehicle in that a non-blocking stationary vehicle is stopped when no other vehicles could make progress anyway (or otherwise in accordance with generally accepted driving rules), therefore the non-blocking stationary vehicle does not impede the other vehicles, per se, (e.g., a traffic light is red, an object has entered the road, the stationary vehicle has another vehicle in front of it). As discussed herein, the blocking vehicle may differ from a non-blocking stationary vehicles in that the blocking vehicle impedes a trajectory determined by the autonomous vehicle 102 (e.g., the blocking vehicle occupies at least part of a same lane as the autonomous vehicle 102 and/or coincides with a path and/or trajectory of the autonomous vehicle 102).

Without resolving the ambiguity of whether a detected vehicle is a non-blocking stationary vehicle or whether the detected vehicle is a blocking vehicle, the perception engine may provide insufficient data to the planner for the planner to generate a trajectory that controls motion of the autonomous vehicle 102 appropriately given the scenario.

Figure 1B:
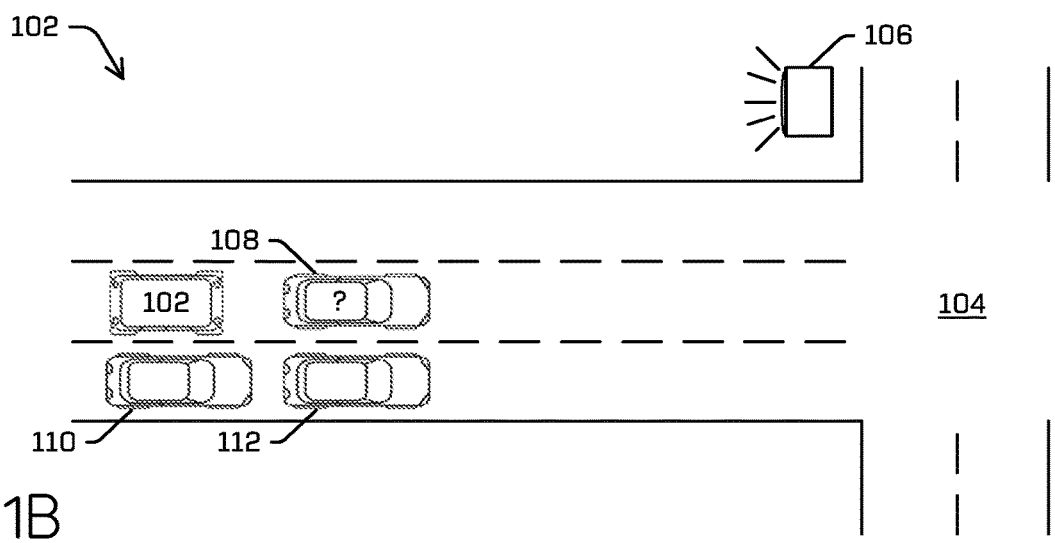
FIG. 1B illustrates an example depicting an autonomous vehicle view of the scenario of FIG. 1A, showing a portion of the scenario of FIG. 1A that is discernable from sensor data collected by the autonomous vehicle.

FIG. 1B illustrates an aerial view of the same example scenario 100 of FIG. 1A and reflects a further complication of the example scenario 100. In particular, FIG. 1B reflects the limited and imperfect view of the scenario available to the autonomous vehicle 102 via the sensor data. Future sensor and perception advances will likely increase the portion of a scenario reflected in sensor data, but it remains likely that the autonomous vehicle 102 will not be apprised of 100% of the states, objects, etc. in or having an effect on a scenario, at least some of the time. FIG. 1B therefore reflects an example portion of the scenario 100 that is reflected by sensor data received by a planner of the autonomous vehicle 102. For example, global map data and a GPS location received from a sensor of the autonomous vehicle 102 might indicate that a junction 104 lies 100 meters in front of the autonomous vehicle 102; sensor data may indicate that the traffic light 106 is green and, in coordination with global map data lidar data, and/or camera data (though any other sensor modality is contemplated), the perception engine may corroborate that the autonomous vehicle 102 is in a lane that is authorized to enter the junction 104 based on the green light; the autonomous vehicle 102 may receive sensor data from which the autonomous vehicle determines that vehicle 108 and vehicles 110 and 112 are stationary vehicles.

Because of limitations of the sensor(s), the autonomous vehicle 102 may not receive sensor data to detect the existence of vehicles 114-122. For example, vehicle 114-122 might be outside a field of view of a sensor, beyond a reliable operational distance of a sensor, or occluded. In some examples, the perception engine may include conditional rules that specify conditions for which to output a blocking vehicle indication. In some examples, the conditional rules may be hard-coded in advance by a programmer or administrator. For example, a hard-coded rule may specify that the perception engine outputs a blocking vehicle indication when a detected vehicle has been classified as a stationary vehicle, a green light has been detected and has remained green for a predetermined duration of time during which the stationary vehicle has not moved, and the stationary vehicle is over 15 meters from the junction 104.

However, such hard-coded rules may not properly account for many potential scenarios. For instance, the example hard-coded rule given above might work for an example where the stationary vehicle 108 was incapacitated and was therefore blocking vehicle 108. However, as FIG. 1A illustrates, there may actually be a long line of cars in front of the stationary vehicle 108 which may be undetectable by the autonomous vehicle 102. Therefore, providing a blocking vehicle indication to the planner for example scenario 100 may produce erroneous or troublesome operation of the autonomous vehicle 102. For example, the planner might initiate a lane change, assuming that the autonomous vehicle 102 would be able to return to the same lane after passing the stationary vehicle 108 that has been indicated by the perception engine as being a blocking vehicle. Because of the long line of cars that exists in front of the stationary vehicle, the autonomous vehicle 102 may be unable to return to the original lane. Classifying the stationary vehicle 108 as a blocking vehicle in this situation would therefore be a false positive. False negatives may similarly disrupt operation of the autonomous vehicle 102. Hard-coded rules may therefore create unacceptable rates of false positives and/or false negatives.

Furthermore, introducing a new feature (e.g., checking whether the perception engine detects that the stationary vehicle's hazard lights are flashing) to a set of hard-coded rules would be time-intensive and require human coding and/or re-configuration of the perception engine. This is undesirable since such re-configuration may require stopping the autonomous vehicle 102 from operating and/or waiting for human re-configuration to be completed, which may require multiple iterations of developing and testing new re-configurations of the perception engine.

In some examples, the techniques discussed herein may, instead, probabilistically determine whether a stationary vehicle is a blocking vehicle via an ML model that is not so limited. This approach is described herein in association with the BV ML model.

Example Process

Figure 2:
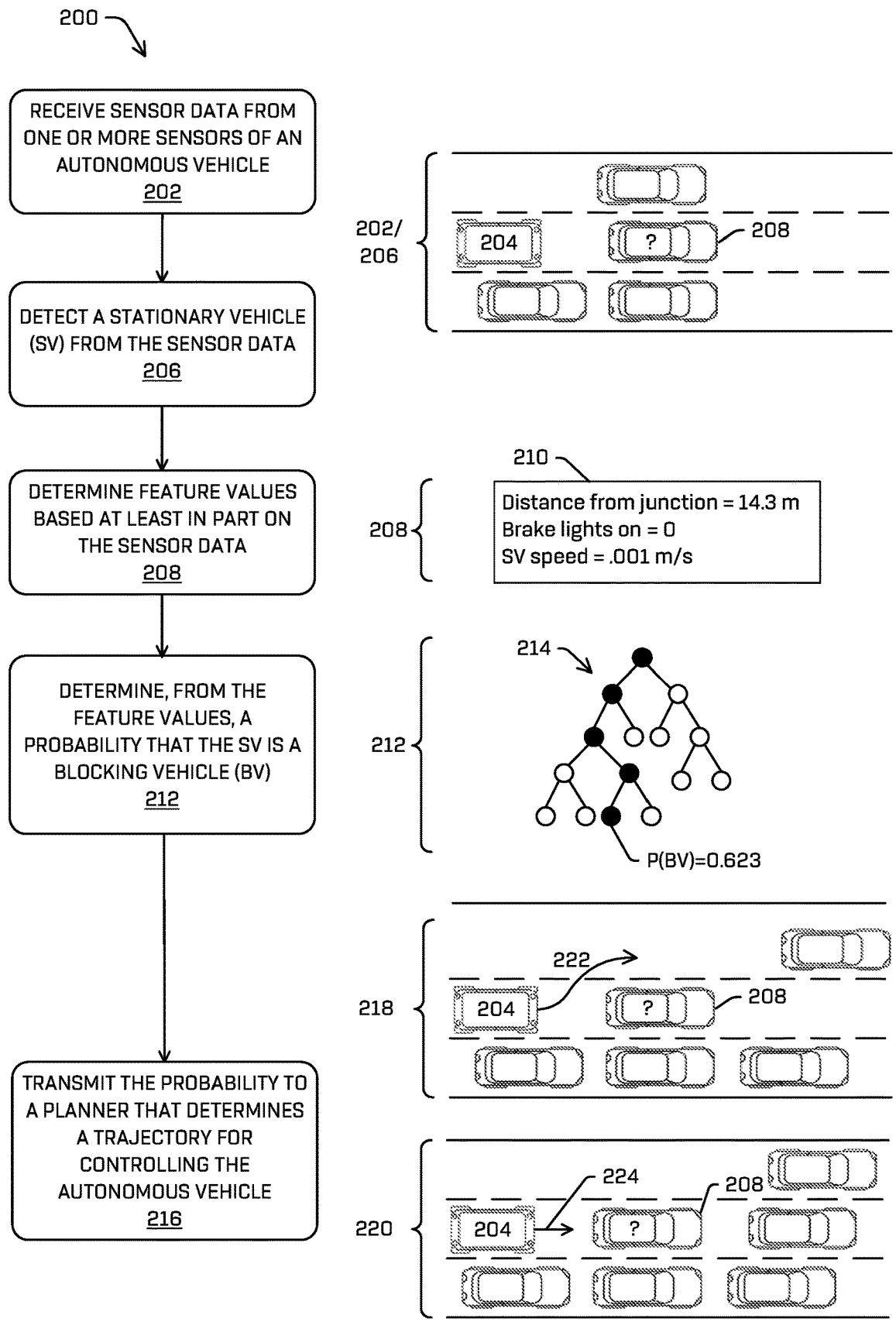
FIG. 2 illustrates a pictorial flow diagram of an example process for detecting blocking vehicles.

FIG. 2 illustrates a pictorial flow diagram of an example process 200 for determining, at an autonomous vehicle, whether a stationary vehicle is a blocking vehicle in order to control the autonomous vehicle. At operation 202, the example process 200 may include receiving sensor data from sensor(s) of an autonomous vehicle 204. In some examples, the sensor data may be additionally or alternatively received from remote sensor(s) such as sensor(s) of another vehicle, sensor(s) of a remote computing device (e.g., a teleoperations service, a weather station, a traffic control service, an emergency service), and/or sensor(s) located in infrastructure (e.g. sensors(s) located on light posts, buildings).

At operation 206, the example process 200 may include detecting a stationary vehicle 208 from the sensor data. This may include detecting an object, classifying that object as a vehicle, and determining that a velocity (or speed) of the vehicle is less than a threshold velocity (or speed). In some examples, the threshold may be a predetermined threshold (e.g., the vehicle is stopped or moving at less than 0.05 meters per second), while in other examples the threshold may be relative (e.g., the vehicle is moving at less than 20% of the average velocity of traffic). In some examples, operation 206 may additionally or alternatively include determining that other features determined from the sensor data meet one or more conditions, such as the vehicle satisfies a distance from a junction, the vehicle is of a particular type (e.g., bike, passenger vehicle), a light traffic light signal is green, etc.

The operation 206 may include detecting all stationary vehicles within "sight" of the sensors of the autonomous vehicle 204 (i.e. those vehicles which are within a field of view of the one or more sensors). In additional or alternate examples, operation 206 may include detecting the stationary vehicles within a predetermined threshold distance. For example, the autonomous vehicle 204 may detect the stationary vehicles within 50 meters. By limiting how far the autonomous vehicle 204 detects stationary vehicles, the autonomous vehicle 204 conserves processing and storage resources. Additionally, by detecting more than just whether a stationary vehicle exists in a same lane as the autonomous vehicle 204, the planner of the autonomous vehicle 204 is able to make more sophisticated decisions about which trajectory to generate and/or choose to control the autonomous vehicle 204.

At operation 208, the example process 200 may include determining feature values 210 based at least in part on the sensor data. In some examples, the feature values 210 may correspond to features specified by a blocking vehicle (BV) ML model. The BV ML model may be configured to determine a probability of whether the stationary vehicle 208 is a blocking vehicle based on feature values 210 determined by a perception engine of the autonomous vehicle 204. In some examples, the autonomous vehicle 204 may attempt to determine feature values 210 for at least a subset of possible features for which the BV ML model is configured. For example, the table below illustrates an example of feature values 210 determined by the perception engine that correspond to features upon which the BV ML may rely on to determine the probability that the stationary vehicle 208 is a blocking vehicle. In the example given, some feature values 210 were either not determined by the perception engine or were not applicable or available from the sensor data (i.e., "Blocked by Another Object," "Other Object Behavior"). Some of these features, and others, are discussed in regards to FIGS. 3A-3F.

| Feature | Feature Value |
| --- | --- |
| Distance from Junction | 14.3 meters |
| Brake Lights on | 0 |
| SV Speed | .001 m/s |
| Traffic Flow Normality | .87 |
| Blocked by Another Object | — |
| Person Near Vehicle | 0 |
| Other Object Behavior | — |
| Type of Agent | "Passenger Vehicle" |

Though several example features are listed above (and with respect to FIGS. 3A-3F), the number and types of features are not to be so limiting. For example, any number of features are contemplated such as, for example, object bounding box size, object color, object height, object size, object width, an object velocity (i.e. a speed and/or direction), object yaw (e.g., relative to an orientation of the vehicle), lane identification (e.g. left, center, right), a GPS location, detected logo and/or text associated with the stationary vehicle, etc. Any of the features may be represented by simply Boolean values (i.e. the feature is present or not), real numbers (such as detected speed), text (such as classification), or any other representation of data.

In some examples, the feature values 210 determined by the perception engine may include at least one of a speed of the stationary vehicle 208, traffic signal state (e.g., traffic light state, existence of traffic sign), traffic flow data, a relation of stationary vehicle data to traffic flow data (e.g., is the stationary vehicle data within a normal distribution of the traffic flow data), a probability that the stationary vehicle 208 is blocked by another object (e.g., based on detecting a residual in sensor data that may indicate existence of an object in front of the stationary vehicle 208), a probability that an occluded object exists that may be indicated by a sensor residual (e.g., noisy radar sensor data that may indicate an object in front of the stationary vehicle 208), a detected person near the stationary vehicle 208 and related data (e.g., proximity of the person to the stationary vehicle, whether the person leaves and returns to the stationary vehicle 208), behavior of other objects (e.g., other vehicles are going around the stationary vehicle 208, other vehicles are not going around the stationary vehicle 208), a classification label (type) of the stationary vehicle 208 (e.g., police car, passenger vehicle, delivery truck) and/or other objects in the environment, door open/closed condition (e.g., a back door or some aperture of the stationary vehicle 208 is open/closed), etc.

At operation 212, the example process 200 may include determining, using the BV ML model 214 and from the feature values, a probability that the stationary vehicle 208 is a blocking vehicle. For instance, the feature values 210 may be input into the BV ML model 214 and the BV ML model 214 may, in response and according to the configuration of the BV ML model 214, output a probability that the stationary vehicle 208 is a blocking vehicle. In some examples, the BV ML model 214 may include a decision tree or any arrangement thereof, such as a random forest and/or boosted ensemble of decision trees; a directed acyclic graph (DAG) (e.g., where the nodes are organized as a Bayesian network); deep learning algorithm(s), such as a artificial neural networks (ANN), deep belief network (DBN), deep stacking network (DSN), or recurrent neural network (RNN); etc. In some examples, the BV ML model 214 may include a gradient-boosted decision tree.

For example, where the BV ML model 214 includes a decision tree, the decision tree may output a positive or negative number to indicate that the stationary vehicle 208 is or is not a blocking vehicle, respectively. In some examples, the BV ML model 214 may include a plurality of decision trees, which may be weighted. For example, one decision tree may be weighted to output a −1.63 or +1.63 and a second decision tree may be weighted to output a −0.76 or +0.76. Once all of the decision trees have output a number, the perception engine may sum their outputs to determine a sum probability that the stationary vehicle 208 is a blocking vehicle.

Where the BV ML model 214 includes a neural network, the BV ML model 214 may include an input layer of nodes, one or more hidden layer of nodes, and an output layer of nodes. In some examples, the input layer of nodes may be configured to receive the one or more feature values and activate nodes of the one or more hidden layers. The output layer may be configured to receive stimuli from nodes of the one or more hidden layers and to output the indication based on nodes of the output layer that are most activated. In some examples, the output layer may comprise two nodes (a positive indication that the stationary vehicle is a blocking vehicle and a negative indication) and/or the output layer provide an output between a strong confidence that the stationary vehicle is a blocking vehicle and strong confidence that the stationary vehicle is not a blocking vehicle. In some examples, the decision tree may be a classification tree in which an output comprises whether or not the detected vehicle is a blocking vehicle.

In some examples, the BV ML model 214 may be generated (learned) from labeled feature data. For example, the BV ML model 214 may include a deep-learning model that learns to output a probability that a stationary vehicle 208 is a blocking vehicle based on input sample feature values that are associated with labels that indicate whether the sample feature values came from scenario where a stationary vehicle 208 was a blocking vehicle or not (i.e., a ground truth label). FIG. 2 illustrates the BV ML 214 as a decision tree, where the shaded nodes are nodes reached by input feature values. The illustrated decision tree may output a weighted probability that the stationary vehicle 208 is a blocking vehicle equal to 0.623. In some examples, positive values may be an indication that the stationary vehicle 208 is a blocking vehicle and negative values may be an indication that the stationary vehicle 208 is not a blocking vehicle, though any sign value is contemplated (e.g. the reverse).

At operation 216, the example process 200 may include transmitting the probability determined by the perception engine to a planner that determines a trajectory for controlling the autonomous vehicle, as depicted at 218 and 220. The planner may use the probability indicating whether the stationary vehicle 208 is a blocking vehicle to generate a trajectory with which to control the autonomous vehicle 204. For example, FIG. 2 illustrates two example trajectories that the planner might determine in alternate scenarios.

In example scenario 218, the perception engine may have output an indication that the stationary vehicle 208 is a blocking vehicle. Responsive to receiving this indication, the planner of the autonomous vehicle 204 may generate a trajectory 222 that causes the autonomous vehicle 204 to merge into another lane. In some examples, the perception engine may additionally provide a classification of blocking vehicle to the planner (e.g., police car, meter reader vehicle, delivery vehicle). In some examples, the classification may be a semantic label. This semantic label may be included as one of the feature values.

In example scenario 220, the perception engine may have output an indication that the stationary vehicle 208 is not a blocking vehicle (i.e., the stationary vehicle 208 is a non-blocking stationary vehicle). Responsive to receiving this indication, the planner of the autonomous vehicle 204 may generate a trajectory 224 that causes the autonomous vehicle 204 to creep forward in the same lane.

In some examples, the perception engine and/or planner may determine to transmit a signal to a remote computing device to receive remote assistance. For example, the autonomous vehicle 204 may transmit a signal to a remote computing device, which may have greater computing power, so that the remote computing device may determine the probability or for a human teleoperator to input an indication that the stationary vehicle 208 is or is not a blocking vehicle. The planner may transmit a signal to the remote computing device if the probability does not satisfy a threshold negative or positive probability, which may indicate a low confidence that the stationary vehicle 208 is or is not a blocking vehicle (e.g., the threshold may be 0.25, defining a probability that may be too low to rely on to generate a trajectory). In some examples, the autonomous vehicle 204 may also transmit sensor data and/or feature values to the remote computing device.

Example Features

FIGS. 3A-3F depict a variety of features that BV ML model may be configured to use to generate a probability that a stationary vehicle is or is not a blocking vehicle. Feature values discussed below may be determined by the perception engine from sensor data. Moreover, the operations discussed below may be accomplished as a part of operation 212 of FIG. 2.

Figure 3A:
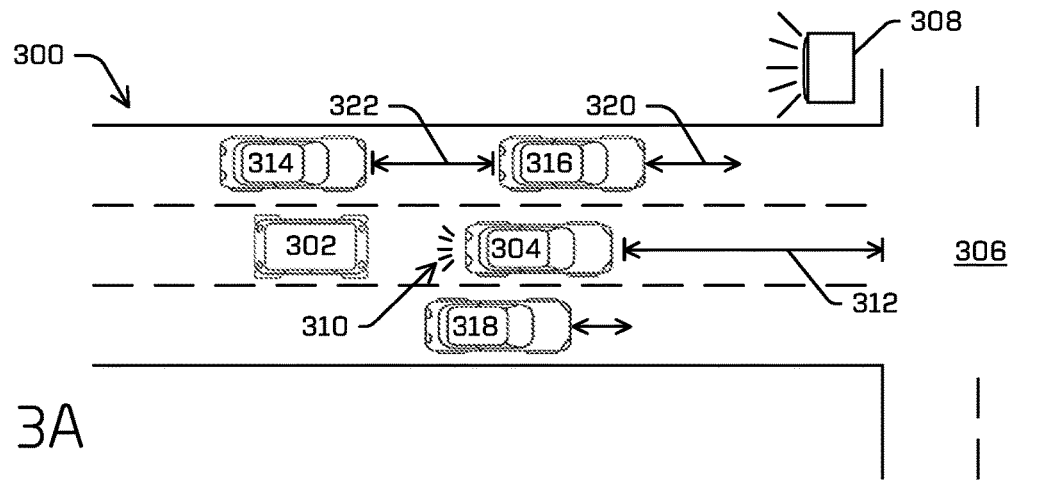
FIGS. 3A-3F illustrate examples of sensor data and features derived therefrom for detecting blocking vehicles.

FIG. 3A depicts an example scenario 300 where an autonomous vehicle 302 approaches a stationary vehicle 304 and a junction 306 that includes a traffic signal 308 (in this example a traffic light). Autonomous vehicle 302 may correspond to autonomous vehicle 204 and the discussion pertinent thereto. The autonomous vehicle 302 may detect that the vehicle 304 is a stationary vehicle by a perception engine according to any of the techniques discussed herein. Responsive to detecting that the vehicle 304 is a stationary vehicle, the autonomous vehicle 302 may determine, by the perception engine, feature values from the sensor data. For example, the autonomous vehicle 302 may determine a condition of lights of the stationary vehicle 304 (e.g., hazard lights on/off, brake lights on/off) as shown at 310; a distance 312 of the stationary vehicle 304 (and/or the autonomous vehicle) from the junction 306 and/or a distance from the stationary vehicle 304 to a next vehicle in front of the stationary vehicle (as may be determined, for example, where the roadway is curved, where a sensor residual is available that may indicate the existence of a vehicle in front of the stationary vehicle 304 (such as RADAR reflections), etc); and/or a state of a traffic signal 308, which may, in some examples, include a traffic light and/or the existence or absence of traffic signage (e.g., green light, yellow light, red light, existence of a stop sign, existence of a yield sign, absence of any detected signage, absence of a detected stop sign). In some examples, the autonomous vehicle 302 may determine a height and/or size of the stationary vehicle 304. In some instances, the height of the autonomous vehicle may be found by the BV ML model to be indicative of the likelihood that the stationary vehicle 304 is a blocking vehicle (e.g., semi-trucks and delivery trucks tend to be taller and tend to longer stops in manners that obstruct portions of the roadway).

In some examples, the perception engine may additionally or alternatively determine logo and/or text associated with the stationary vehicle 304 as one of the feature values. For example, a machine-learning algorithm of the planner may determine that the stationary vehicle 304 is associated with a pizza delivery sign (e.g., on top of the vehicle), a taxi service sign, a text and/or a logo (e.g., UPS text and/or logo, Uber text and/or logo). In some examples, the text and/or logo may be classified or used to strengthen the confidence of a classification of a type of the stationary vehicle 304 (e.g., delivery vehicle, public transportation vehicle).

In some examples, the perception engine may additionally or alternatively determine traffic flow data from the sensor data. Traffic flow data may include data for additional objects classified as a vehicles as detected by the perception engine (i.e., vehicles 314, 316, and 318). This data may include a velocity 320 of a vehicle, a distance 322 between the vehicle and a next and/or previous vehicle, etc.

Figure 3B:
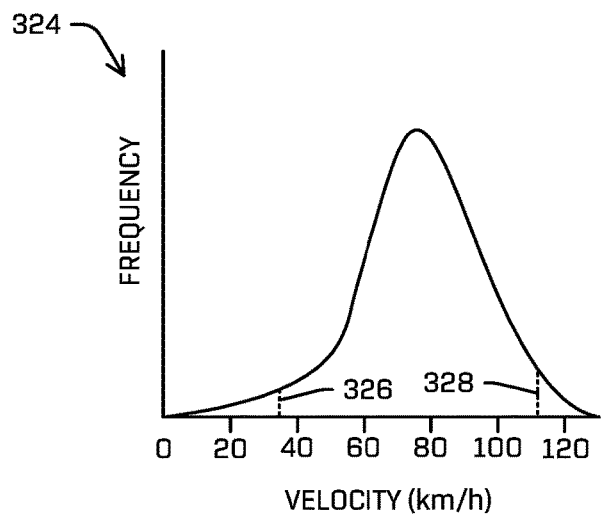

For example, FIG. 3B shows an example distribution 324 of traffic flow data. In some examples, such a distribution may reflect the frequency of various detected feature values related to other objects (e.g. as a distribution, histogram). This may include a distribution of velocities of other vehicles determined by the perception engine. The example distribution 324 shows that the perception engine has determined that a majority of the detected vehicles are moving at a velocity between approximately 55 kilometers per hour and 110 kilometers per hour. Although velocity is portrayed in FIG. 3B and discussed herein, it is understood that any other feature value that may be unique to each vehicle may also be represented in a distribution. For example, distance between vehicles, door open/closed, person-near-vehicle, traffic light indication, etc. may be unique to each vehicle (or to a lane of vehicles), whereas some traffic light indications, etc. may not. For the sake of clarity, when referring to a frequency distribution of feature values of other vehicles, such feature values are termed "traffic flow data" herein.

The perception engine may use a frequency distribution of traffic flow data associated with detected vehicles to output a feature value that includes at least one of a percentile of the traffic flow data associated with the stationary vehicle 304, characteristics of the distribution (e.g., whether the distribution includes a long tail, whether a long tail is eliminated by reducing traffic flow data reflected in the distribution to vehicles of particular lane(s), the width of the distribution, the height of the distribution), whether traffic flow data associated with the stationary vehicle 304 lies within a tail, etc. For example, FIG. 3B depicts thresholds 326 and 328, which may indicate a quartile location and/or a percentile (e.g., $5^{th}$ and $95^{th}$ percentiles, respectively). The perception engine may use these thresholds 326 and/or 328 to indicate whether a velocity and/or another feature value associated with the stationary vehicle 304 is within the body of the distribution (of feature values of other observed vehicles) or in a tail defined by the thresholds 326 and/or 328. For example, the perception engine may determine whether a velocity and/or another feature value associated with the stationary vehicle 304 is within or outside two standard deviations of the mean of a Gaussian distribution. Regardless of what method is used, if the perception engine determines that the velocity and/or other feature value is outside the normal range (as discussed above), the perception engine may determine that the velocity and/or other feature value of the stationary vehicle 304 is anomalous.

It is understood that the perception engine may otherwise use traffic flow data to identify corresponding data of stationary vehicle 304 as being anomalous. Note that, although it is more likely that a stationary vehicle 304 would fall into the lower tail, in some examples, the upper tail may be used for other purposes, such as identifying an erratic vehicle.

In some examples, the perception data may generate traffic flow data for vehicles of a same type or general classification as the stationary vehicle. For example, where the stationary vehicle 304 has been classified as a bicycle, the perception engine may generate traffic flow data for other bicycles that the perception engine has detected. In another example, where the stationary vehicle 304 has been classified as a passenger vehicle the perception engine may generate traffic flow data for objects classified as vehicles, passenger vehicles, and/or motor vehicles.

Figure 3C:
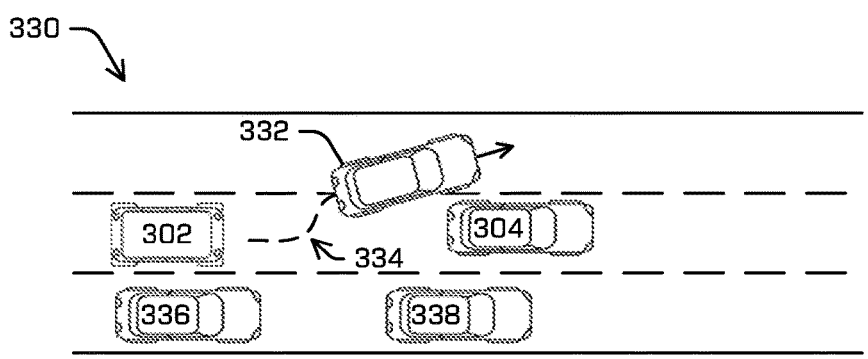

FIG. 3C depicts an additional or alternate feature 330 for which the perception engine may determine a feature value. The perception engine of the autonomous vehicle 302 may generate a feature value that indicates behavior of other objects in relation to the stationary vehicle 304. For example, the perception engine may store a track 334 of another vehicle, such as vehicle 332, and may output the track as a feature value.

In additional or alternate examples, the perception engine may output an indication that classifies the track as the feature value. For example, the indication may include an indication that the vehicle 332 is changing lanes, remaining stationary, etc. As with traffic flow data, the perception engine may relay a frequency with which other objects repeat a behavior. In some examples, this frequency may be constricted to objects that are in a same lane as the autonomous vehicle 302 or may be more heavily weighted for objects that exhibit behavior that originated in a lane of the autonomous vehicle 302. For instance, vehicles 336 and 338 may be parked vehicles. Since vehicles 336 and 338 are in a different lane, constraining a determination of a frequency of a behavior exhibited by other vehicles to a same lane of the autonomous vehicle 302 may increase accuracy of the trajectory generated by the planner in response to receiving the determined frequency. For example, if the determination was not constrained to a same lane of the autonomous vehicle 302, the feature value may indicate that 2 vehicles (66% of vehicle behavior exhibited) have remained stationary and 1 vehicle (33% of vehicle behavior exhibited) have passed the stationary vehicle. Whereas, by constraining the determination to the frequency of behavior in the same lane of the autonomous vehicle 302, this feature value may indicate that 1 vehicle (100% of vehicle behavior exhibited) has passed the stationary vehicle.

In an additional or alternate example, the autonomous vehicle 302 may detect all stationary vehicles (i.e. those vehicles not solely those constrained to a same lane) within a range of the sensors of the autonomous vehicle 302 or within a predetermined threshold distance of the autonomous vehicle 302 (e.g., 50 meters, 100 meters). In such an example, information regarding a stationary vehicle in other lanes may be used in planning how other vehicles may react (e.g. planning a route into the lane of the autonomous vehicle and around a double-parked vehicle). A feature value may reflect the location and/or other feature values associated with these other detected stationary vehicles.

Figure 3D:
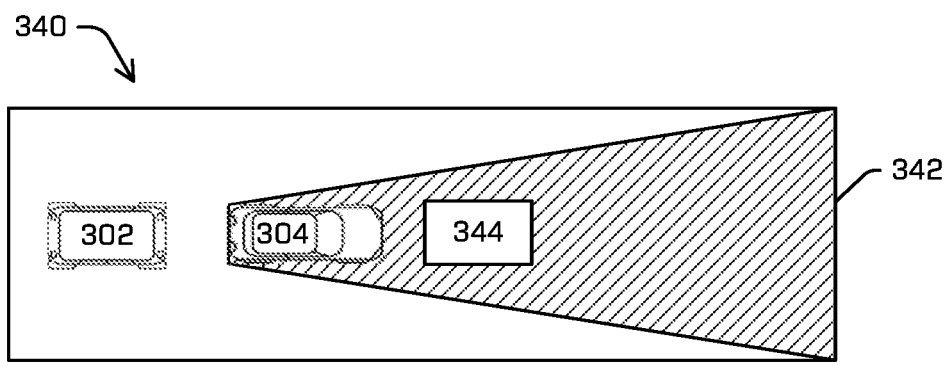

FIG. 3D depicts an additional or alternate feature 340. The shaded portion of FIG. 3D indicates an area 342 of the environment that is occluded to at least one of the sensors of the autonomous vehicle 302 (e.g., by surfaces of the stationary vehicle 304). The perception engine of the autonomous vehicle 302 may generate a feature value that indicates a probability that there is an occluded object 344 in front of the stationary vehicle 304 or otherwise in the occlusion area 342.

In some examples, the perception engine may determine that the sensor data includes a residual that may indicate the existence of the occluded object 344. For example, the residual may include a portion of an image/video that indicates the existence of an object but is unclassifiable, a SONAR and/or RADAR anomaly, etc. Taking RADAR as an example, the perception engine may determine a probability that the occluded object 344 exists based on determining a portion of the RADAR data that is attributable to the vehicle and/or other identified environmental objects (e.g., the roadway) and determining that a residual of the RADAR data may indicate the existence of the occluded object 344. For example, the RADAR data may include reflections that noisily indicate the existence of an object that is a distance from the autonomous vehicle 302 that exceeds a distance from the autonomous vehicle 302 to the stationary vehicle 304. These noisy reflections may be refracted from the occluded object 344 to a RADAR sensor of the autonomous vehicle under the undercarriage of the stationary vehicle 304 in some instances and/or via a nearby object (e.g., a wall).

In some examples, the feature values may include a distance from the stationary vehicle 304 to the object 344. This may include examples where the object 344 is occluded from direct sensor "view" or in examples where the object 344 is at least partly within "view" of the sensors.

Figure 3E:
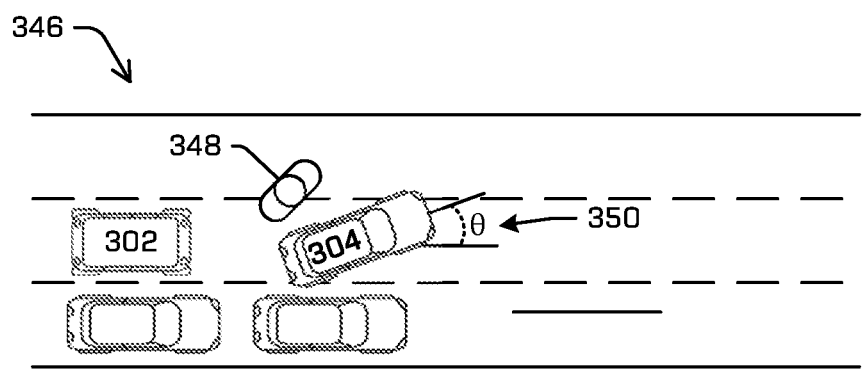

FIG. 3E depicts an additional or alternate feature 346 for which the perception engine may determine a feature value. The perception engine of the autonomous vehicle 302 may generate a feature value that indicates the existence of a person 348 near the stationary vehicle 304. In some examples, the feature value may indicate a distance between the person 346 and the stationary vehicle 304, whether the person 348 leaves and returns to the stationary vehicle 304, a number of persons near the stationary vehicle 304, and/or whether a door or other aperture of the stationary vehicle 304 is open. In some examples, the feature values may additionally or alternatively indicate a yaw 350 of the stationary vehicle 304. The yaw may be determined relative to a pose of the autonomous vehicle 302 and/or relative to a direction of a lane. FIG. 3E depicts an example where the yaw 350 is determined relative to both a heading of the autonomous vehicle 302 and the lane since the heading and lane lie parallel in the depicted example.

Figure 3F:
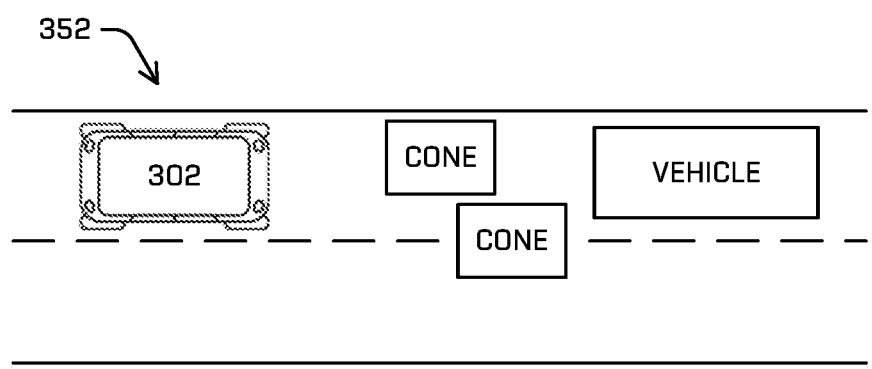

FIG. 3F depicts an additional or alternate feature 352 for which the perception engine may determine a feature value. The perception engine of the autonomous vehicle 302 may generate a feature value that indicates classifications of detected objects (e.g., delivery truck, cone, flagger, flare) and/or meta-classifications describe a group of classifications (e.g., delivery, construction zone, incapacitated vehicle).

In sum, the perception engine may determine one or more feature values (e.g., 15 meters from stationary vehicle to junction, "delivery truck," green light, traffic flow data including the velocities of other detected vehicles and/or an indication of whether a velocity of the stationary vehicle is anomalous compared to all other vehicles, vehicles of a same lane, or another subset of detected vehicles) that correspond to feature(s) upon which the BV ML model has been trained. The BV ML model may push these, and any other, feature values through nodes of the BV ML model to determine a probability that the stationary vehicle is a blocking vehicle.

Example Architecture

Figure 4:
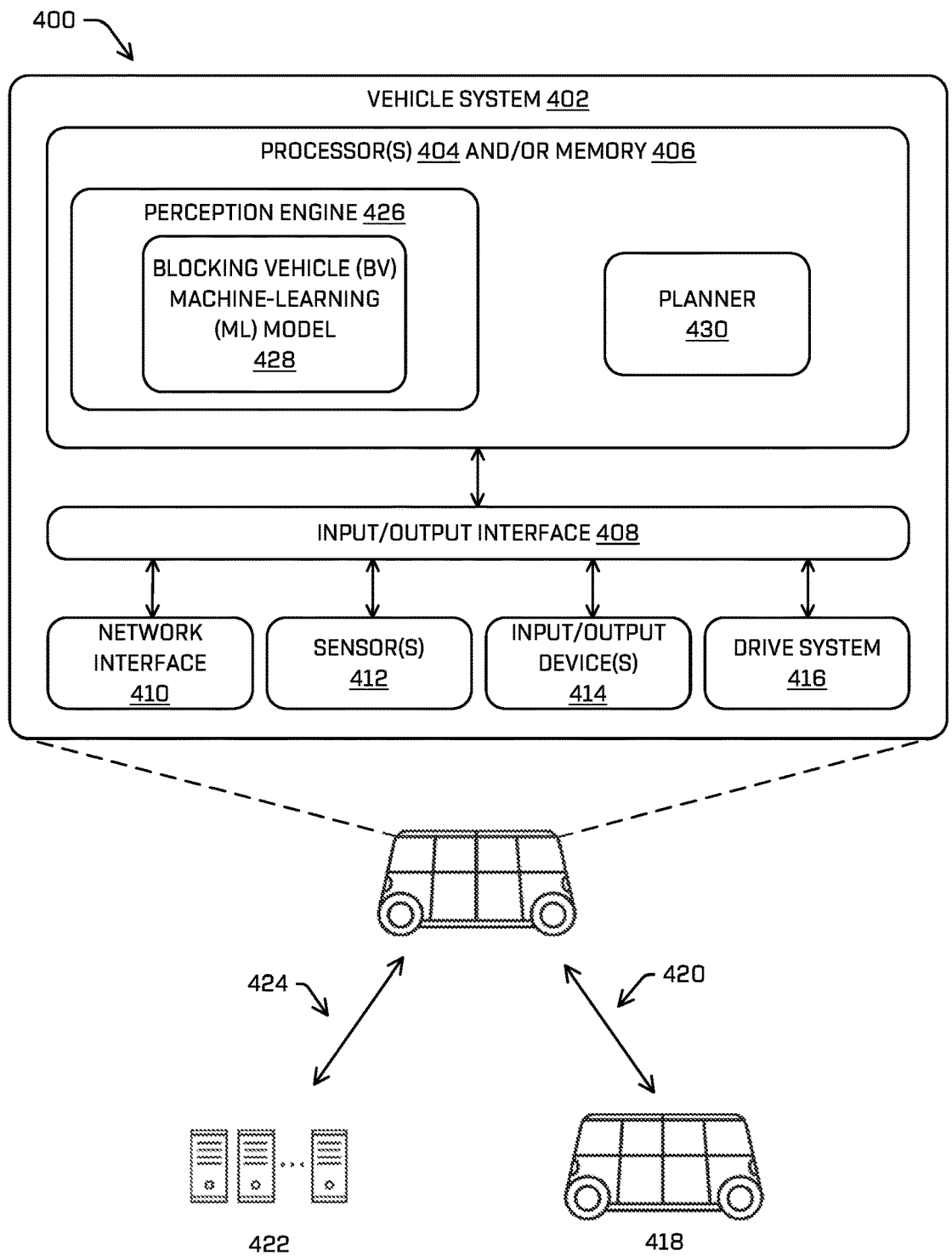
FIG. 4 illustrates a block diagram of an example architecture for detecting blocking vehicles that includes an example vehicle system.

FIG. 4 is a block diagram of an example architecture 400 including an example vehicle system 402 for controlling operation of at least one vehicle, such as an autonomous vehicle, according to any of the techniques discussed herein. In some examples, the vehicle system 402 may represent at least a portion of autonomous vehicle 204 and/or 302. In some examples, this architecture may be used to control an autonomous vehicle that encounters a stationary vehicle.

In some examples, the vehicle system 402 may include processor(s) 404 and/or memory 406. These elements are illustrated in combination in FIG. 4, although it is understood that they may be separate elements of the vehicle system 402, and that components of the system may be implemented as hardware and/or software, in some examples.

Processor(s) 404 may include a uniprocessor system including one processor, or a multiprocessor system including several processors (e.g., two, four, eight, or another suitable number). The processor(s) 404 may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor 404 may commonly, but not necessarily, implement the same ISA. In some examples, the processor(s) 404 may include a central processing unit (CPU), a graphics processing unit (GPU), Field Programmable Gate Arrays (FPGA), Application Specific Integrated Circuit (ASIC), or a combination thereof.

The example vehicle system 402 may include memory 406. In some examples, the memory 406 may include a non-transitory computer readable media configured to store executable instructions/modules, data, and/or data items accessible by the processor(s) 404. In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the example vehicle system 402 via an input/output ("I/O") interface 408. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface 410.

Furthermore, though illustrated as a single unit in FIG. 4, it is understood that the processor(s) 404 and memory 406 may be distributed among multiple computing devices of the vehicle and/or among multiple vehicles, data centers, teleoperation centers, etc.

In some examples, the input/output ("I/O") interface 408 may be configured to coordinate I/O traffic between the processor(s) 404, the memory 406, the network interface 410, sensor(s) 412, I/O devices 414, drive system 416, and/or any other hardware of the vehicle system 402. In some examples, the I/O devices 414 may include external and/or internal speaker(s), display(s), passenger input device(s), etc. In some examples, the I/O interface 408 may perform protocol, timing, or other data transformations to convert data signals from one component (e.g., the non-transitory computer readable media) into a format suitable for use by another component (e.g., processor(s)). In some examples, the I/O interface 408 may include support for devices attached through various types of peripheral buses, such as the Peripheral Component Interconnect (PCI) bus standard, the Universal Serial Bus (USB) standard, or a variant thereof, for example. In some implementations, the function of the I/O interface 408 may be split into two or more separate components, such as a north bridge and a south bridge, for example. Also, in some examples, some or all of the functionality of the I/O interface 408, such as an interface to the memory 406, may be incorporated directly into the processor(s) 404 and/or one or more other components of the vehicle system 402.

The example vehicle system 402 may include a network interface 410 configured to establish a communication link (i.e., "network") between the vehicle system 402 and one or more other devices. For example, the network interface 410 may be configured to allow data to be exchanged between the vehicle system 402 and another vehicle 418 (e.g., vehicle(s) 104(2) and (3), for example) via a first network 420, and/or between the vehicle system 402 and a remote computing system 422 via a second network 424. For example, the network interface 410 may enable wireless communication between another vehicle 418 and/or the remote computing device 422. In various implementations, the network interface 410 may support communication via wireless general data networks, such as a Wi-Fi network, and/or telecommunications networks, such as, for example, cellular communication networks, satellite networks, and the like.

In some examples, the sensor data discussed herein may be received at a first vehicle and transmitted to a second vehicle. In some examples, sensor data received from a different vehicle may be incorporated into the feature values determined by the perception engine. For example, the sensor data received from the first vehicle may be used to fill in a feature value that was unavailable to the second vehicle and/or to weight feature values determined by the second vehicle from sensor data received at the second vehicle.

The example vehicle system 402 may include sensor(s) 412, for example, configured to localize the vehicle system 402 in an environment, to detect one or more objects in the environment, to sense movement of the example vehicle system 402 through its environment, sense environmental data (e.g., ambient temperature, pressure, and humidity), and/or sense conditions of an interior of the example vehicle system 402 (e.g., passenger count, interior temperature, noise level). The sensor(s) 412 may include, for example, one or more lidar sensors, one or more cameras (e.g. RGB-cameras, intensity (grey scale) cameras, infrared cameras, depth cameras, stereo cameras), one or more magnetometers, one or more radar sensors, one or more sonar sensors, one or more microphones for sensing sounds, one or more IMU sensors (e.g., including accelerometers and gyroscopes), one or more GPS sensors, one or more Geiger counter sensors, one or more wheel encoders, one or more drive system sensors, a speed sensor, and/or other sensors related to the operation of the example vehicle system 402.

The example vehicle system 402 may include a perception engine 426, a BV ML model 428, and a planner 430.

The perception engine 426 may include instructions stored on memory 406 that, when executed by the processor(s) 404, configure the processor(s) 404 to receive sensor data from the sensor(s) 412 as input, and output data representative of, for example, one or more of the pose (e.g. position and orientation) of an object in the environment surrounding the example vehicle system 402, an object track associated with the object (e.g., a historic position, velocity, acceleration, and/or heading of the object over a period of time (e.g. 5 seconds)), and/or an object classification associated with the object (e.g. a pedestrian, a vehicle, a bicyclist, etc.). In some examples, perception engine 426 may be configured to predict more than an object trajectory of one or more objects. For example, the perception engine 426 may be configured to predict multiple object trajectories based on, for example, probabilistic determinations or multi-modal distributions of predicted positions, trajectories, and/or velocities associated with an object.

The perception engine 426 may include instructions stored on memory 406 that, when executed by the processor(s) 404, configure the processor(s) 404 to receive sensor data from the sensor(s) 412 as input, and output an indication that the perception engine detects a stationary vehicle from the sensor data and may output one or more feature values. These feature values may also be stored in the memory 406. For example, this may include instructions configuring the processor(s) 404 to determine a distance between a stationary vehicle and a traffic light from an image and/or a cloud of lidar points. The perception engine 426 may transmit the feature values to the BV ML model 428.

The BV ML model 428 may include instructions stored on memory 406 that, when executed by the processor(s) 404, configure the processor(s) 404 to receive feature values associated with elements of the environment in which the vehicle system 402 exists, and determine a probability that the stationary vehicle is a blocking vehicle. The BV ML model 428 may include a decision tree(s), and/or deep learning algorithm(s), having nodes through which feature values may be pushed to determine and output.

The perception engine 426 may transmit the probability that the stationary vehicle is a blocking vehicle to the planner 430 along with any other additional information that the planner 430 may use to generate a trajectory (e.g., object classifications, object tracks, vehicle pose). In some examples, the perception engine 426 and/or the planner 430 may additionally or alternatively transmit a blocking vehicle indication via the network interface 410 to the remote computing device 422 via network 424 and/or another vehicle 418 via network 420, based, at least in part, on the probability determined by the perception engine 426. In some examples, this indication may be used by another vehicle 418 as a feature value if the vehicle 418 encounters a stationary vehicle at the same location as indicated by the perception engine 426 of the vehicle system 402. In some examples, this may include temporarily modifying a global map to include a blocking vehicle indication, where the global map is accessible via a network to a fleet of vehicles.

In some examples, the perception engine and/or the BV ML model 428 may be located at another vehicle 418 and/or the remote computing device 422. In some examples, a perception engine located at another vehicle 418 and/or remote computing device 422 may coordinate determinations with the perception engine 426. For example, the other vehicle 418 and/or remote computing device 422 may determine one or more feature values and/or the probability. In an example where the other vehicle 418 and/or remote computing device 422 determine one or more feature values, the other vehicle 418 and/or remote computing device 422 may transmit the one or more feature values to the vehicle system 402 via networks 420 and/or 424, respectively. The perception engine 426 may include the one or more feature values received from the other vehicle 418 and/or remote computing device 422 in feature values that the perception engine 426 pushes through the BV ML model 428. In some examples where the BV ML model 428 is located at the other vehicle 418 and/or remote computing device 422, the other vehicle 418 and/or remote computing device 422 may receive one or more feature values from the vehicle system 402 via networks 420 and 424, respectively, and may determine a probability that the stationary vehicle is a blocking vehicle. The other vehicle 418 and/or remote computing device 422 may then transmit this probability back to a planner 430 of the vehicle system 402.

In some examples, the remote computing device 422 may include a teleoperations device. The teleoperations device may be a device configured to respond to sensor data and/or one or more feature values with an indication of whether the stationary vehicle is a blocking vehicle. In additional or alternate examples, the teleoperations device may display information related to the sensor data and/or the one or more feature values that may be useful for receiving an input from a remote operator ("teleoperator") corroborating or identifying an indication that the stationary vehicle is/is not a blocking vehicle. In such examples, the teleoperations device may include an interface for receiving input, such as an indication that the stationary vehicle is a blocking vehicle is a true positive or a false positive, from the teleoperator. In some examples, the teleoperations device may respond to the autonomous vehicle and/or additional autonomous vehicles corroborating the indication or identifying the indication as a false positive.

In some examples, a teleoperator may input a feature value into the remote computing device 422 that may transmitted to the vehicle system 402 for use by the BV ML model 428 and/or input into a BV ML model located at the remote computing device 422.

The planner 430 may include instructions stored on memory 406 that, when executed by the processor(s) 404, configure the processor(s) 404 to generate data representative of a trajectory of the example vehicle system 402, for example, using data representing a location of the example vehicle system 402 in its environment and other data, such as local pose data, and the probability that the stationary vehicle is a blocking vehicle. In some examples, the planner 430 may substantially continuously (e.g., every 1 or 2 milliseconds, though any receding horizon time is contemplated) generate a plurality of potential trajectories with which to control the example vehicle system 402 and select one of the trajectories with which to control the vehicle. The selection may be based at least in part on a current route, the probability that the stationary vehicle is a blocking vehicle, current vehicle trajectory, and/or detected object trajectory data. Upon selecting a trajectory, the planner 430 may transmit the trajectory to the drive system 416 to control the example vehicle system 402 according to the selected trajectory.

In some examples, the perception engine 426, the BV ML model 428, and/or the planner 430 may further include specialized hardware such as, for example, a processor that is suited to running the perception engine (e.g., a graphics processor, an FPGA).

Example Process

Figure 5:
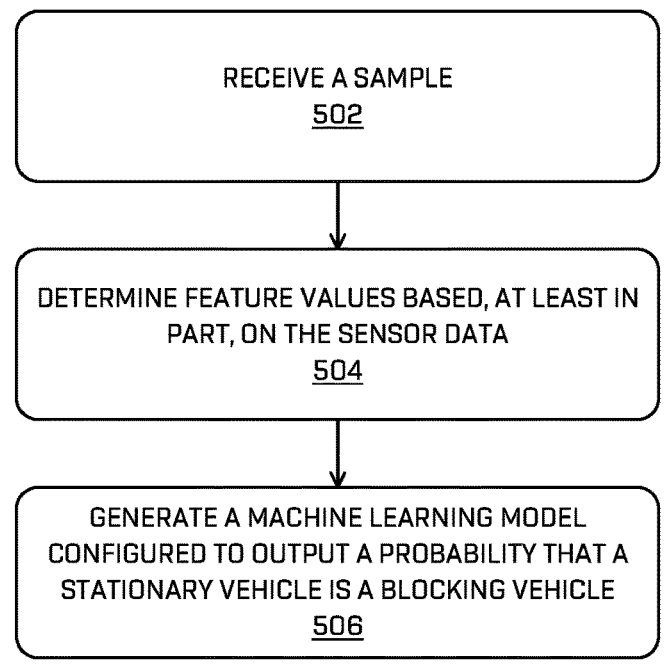
FIG. 5 illustrates a flow diagram of an example process for training a blocking vehicle machine-learning model according to techniques discussed herein.

FIG. 5 illustrates a flow diagram of an example process 500 for training a BV ML model according to techniques discussed herein.

At operation 502, the example process 500 may include receiving a sample that includes sensor data associated with a label indicating a stationary non-blocking vehicle or a stationary blocking vehicle, according to any of the techniques discussed herein. For example, thousands or tens of thousands of samples may be received, each sample including sensor data for a discrete scenario and a label associated with the sensor data (e.g. blocking or non-blocking).

At operation 504, the example process 500 may include determining feature values for the sample based, at least in part, on the sample sensor data, according to any of the techniques discussed herein. In some examples, determining the feature values from the sensor data may include receiving a feature upon which to train the BV ML model—this feature may correspond to something the perception engine may classify or otherwise determine (e.g., a condition of a traffic light, an object track and/or classification, a distance to a junction)—and determining a value for the feature from the sample data (e.g., for a sample that includes sensor data including a video where a traffic light is green, the perception engine may generate a feature value that corresponds to the green light, such as the word "green" or a numeric value that symbolizes a green light). Feature value determination may be repeated for all the samples received at operation 502.

At operation 506, the example process 500 may include generating a BV ML model configured to output a probability that a stationary vehicle is a blocking vehicle based, at least in part, on the one or more feature values and the label associated with the sample, according to any of the techniques discussed herein. For example, and depending on the type of ML model generated (e.g., decision tree(s), deep learning model), training the BV ML model may include generating nodes, connection weights, node layers, and/or layer types that map input feature values to a label. The resultant BV ML model may thereby, at runtime, receive a set of feature values from the perception engine and output an indication that the stationary vehicle is or is not a blocking vehicle. In some examples, indication may include a probability (e.g., a real-valued number) that the planner may use to generate a trajectory for controlling the autonomous vehicle.

For example, for a higher-valued positive indication that the stationary vehicle is a blocking vehicle, such as a probability that equals or exceeds 1, the planner might generate a trajectory that causes the autonomous vehicle to merge into a different lane. For a lower-valued positive indication that the stationary vehicle is a blocking vehicle, such as a probability that is less than 1, the planner might determine a trajectory to remain in position for a few more seconds before re-evaluating or transmit a request for teleoperations assistance to a remote computing device. For either a higher-valued (greater than or equal to 1) or lower-valued (less than 1) negative indication that the stationary vehicle is a blocking vehicle, the planner may determine a trajectory to remain in position. It is contemplated that the actual values employed by the planner to take different actions will depend on a configuration of the planner.

Figure 6:
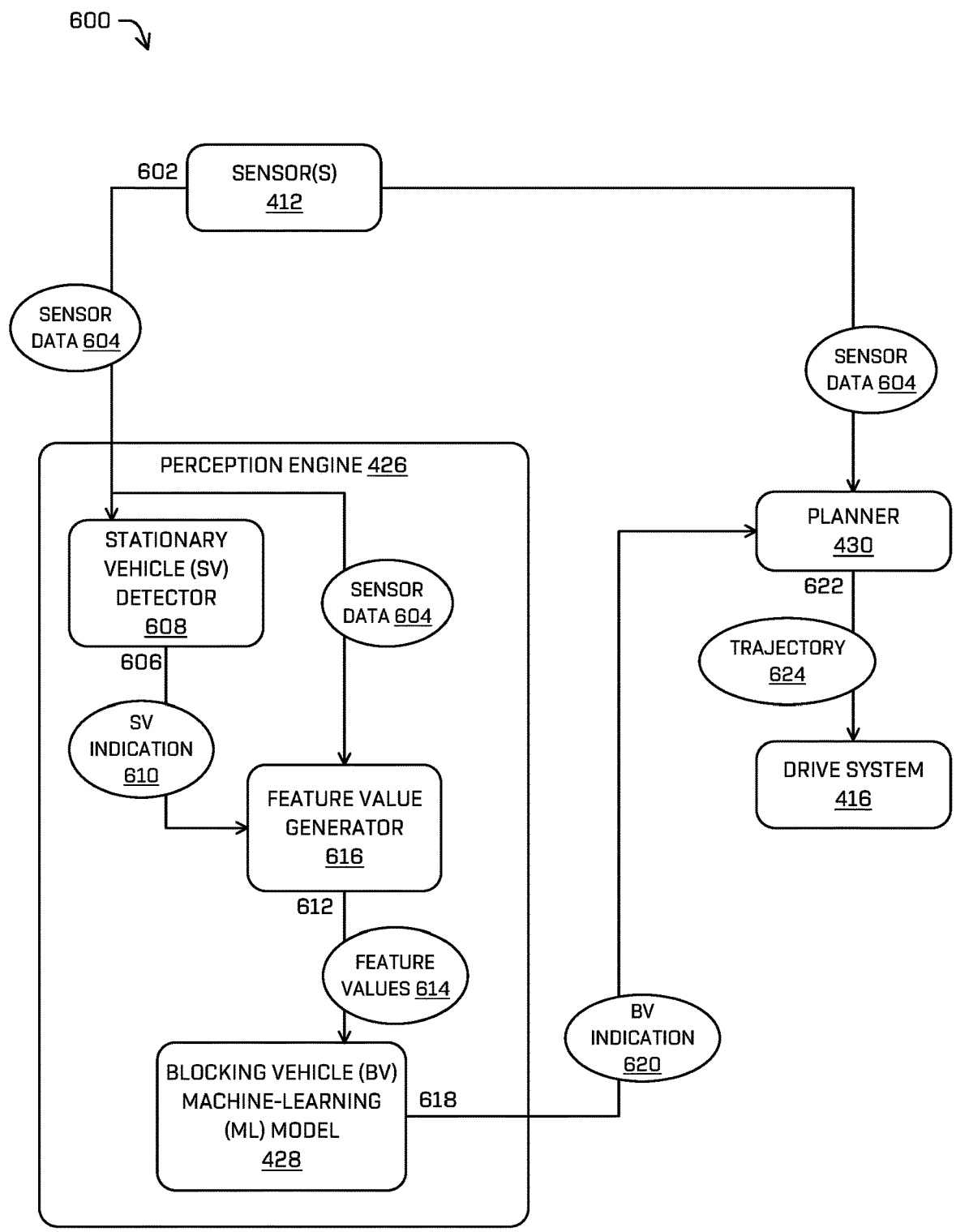
FIG. 6 illustrates a schematic flow diagram of an example process for detecting a blocking vehicle using a machine-learning model according to techniques discussed herein.

FIG. 6 illustrates a flow diagram of an example process 600 for detecting blocking vehicles. For example, the operations of example process 600 may be conducted by one or more processors of an autonomous vehicle or other components thereof and as described below.

At operation 602, the example process 600 may include receiving sensor data 604 from at least one sensor 412, according to any of the techniques discussed herein. For example, the sensor data 604 may be received at the perception engine 426.

At operation 606, the example process 600 may include detecting a stationary vehicle in an environment of the autonomous vehicle based, at least in part, on the sensor data 604, according to any of the techniques discussed herein. For example, this may include detecting existence of an object in an environment of the autonomous vehicle, classifying the object as a vehicle, determining a speed of the vehicle, and determining that the speed of the vehicle does not satisfy a predetermined threshold speed. In additional or alternate examples, this may include determining that the vehicle is impeding a previously generated trajectory of the autonomous vehicle and/or determining that the vehicle impedes another vehicle that is also in the environment of the autonomous vehicle. One or more of these operations may include inputting the sensor data 604 into a stationary vehicle detector 608, which may include one or more machine learning algorithms of the perception engine 426 or other components thereof. In some examples, a stationary vehicle indication 610 may be generated (e.g., changing a register or flag value, transmitting a command to another component of the perception engine 426).

At operation 612, the example process 600 may include determining one or more feature values 614, according to any of the techniques discussed herein. For example, determining the one or more feature values 614 may include (1) detecting one or more other vehicles on the road other than the stationary vehicle and the autonomous vehicle, and (2) determining a feature value that indicates as a speed of the stationary vehicle and speeds of the one or more other vehicles. In some examples, this feature value may include an indication of whether the stationary vehicle's speed is anomalous compared of the one or more other vehicles and/or a distribution of traffic flow data indicating the speed of the stationary vehicle and the speeds of the one or more other vehicles. In some examples, a collection of various components of the perception engine 426, referred to generally as a feature value generator 616 in FIG. 6, (e.g., various machine-learning algorithms that perform natural language processing, object detection, object classification, object tracking) may determine the feature values 614 based, at least in part, on the sensor data 604 and/or the stationary vehicle indication 610.

In some examples, operation 612 may additionally include providing the one or more feature values 614 as input to an ML model (e.g., BV ML model 428), according to any of the techniques discussed herein.

At operation 618, the example process 600 may include receiving, from the ML model, an indication 620 that the stationary vehicle is a blocking vehicle or a non-blocking vehicle (i.e., BV indication 620 in FIG. 6), according to any of the techniques discussed herein. For example, the indication 616 may include a label (e.g., "blocking vehicle," "non-blocking vehicle") and/or a probability. In some examples, the perception engine 426 may receive the indication 620 and/or the BV ML model 428 or the perception engine 426 may transmitting the indication 620 to a planner 430, according to any of the techniques discussed herein. The planner 430 may, in some examples, additionally at least one of receive sensor data 604, data from the perception engine 426 (e.g., object classifications, object tracks), etc.

At operation 622, the example process 600 may include generating trajectory 624 for controlling motion of the autonomous vehicle, according to any of the techniques discussed herein. For example, the planner 430 may generate candidate trajectories based, at least in part, on the indication 616, and select one of the candidate trajectories for controlling the autonomous vehicle. The planner 430 may transmit the selected trajectory to the drive system 416 of the autonomous vehicle.

Figure 7:
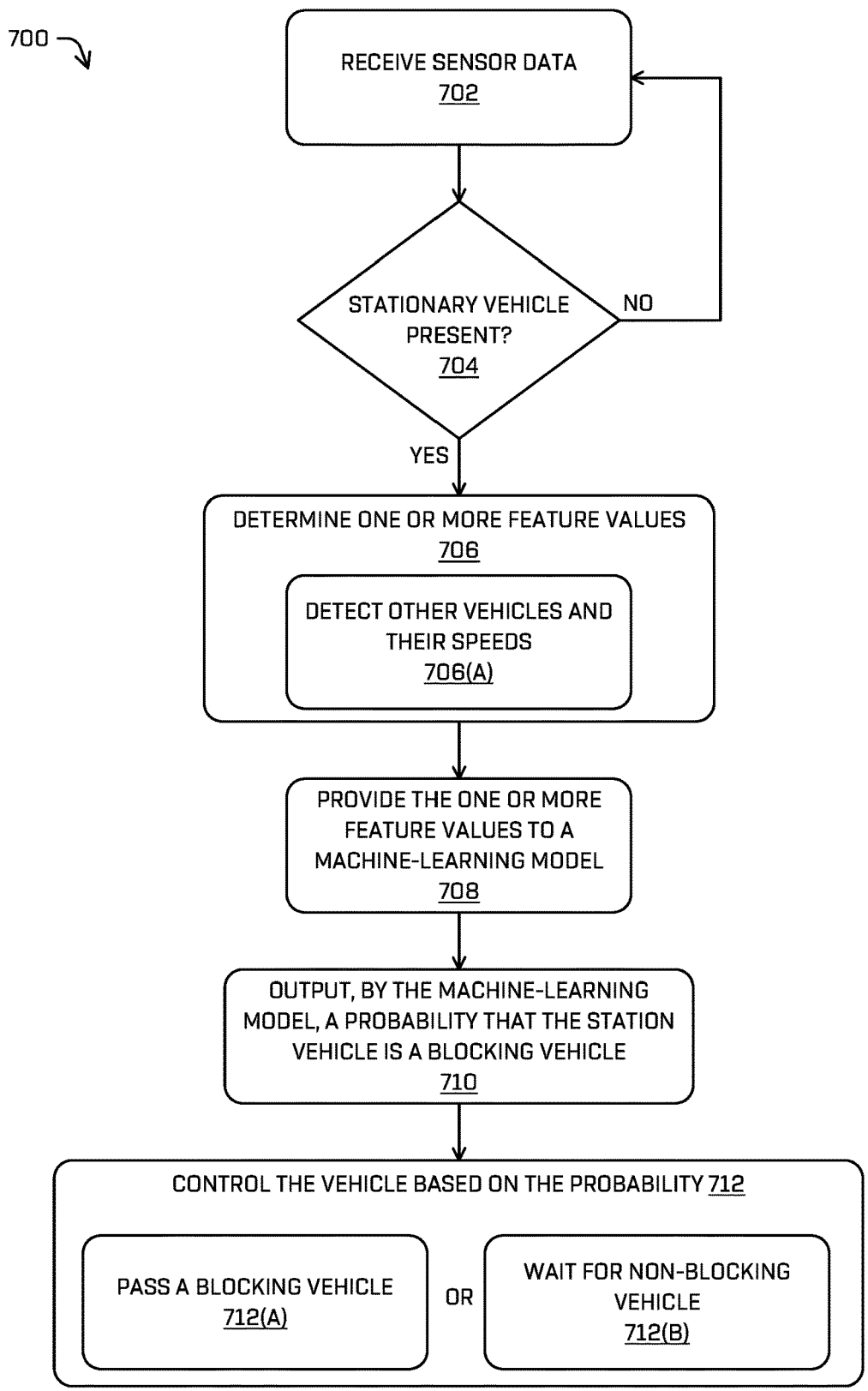
FIG. 7 illustrates a flow diagram of an example process for training a blocking vehicle machine-learning model according to techniques discussed herein.

FIG. 7 illustrates a flow diagram of an example process 700 for detecting blocking vehicles. For example, the operations of example process 700 may be conducted by one or more processors of an autonomous vehicle or other components thereof and as described below and/or the operations may be conducted by a remote computing system, such as another autonomous vehicle and/or a teleoperations device.

At operation 702, the example process 700 may include receiving sensor data, according to any of the techniques discussed herein.

At operation 704, the example process 700 may identify a stationary vehicle (i.e., the "YES" arm in the flow diagram), according to any of the techniques discussed herein. In some examples, if a stationary vehicle is not identified, the process 700 may revert to operation 702.

At operation 706, the example process 700 may include determining one or more feature values based, at least in part, on the sensor data, according to any of the techniques discussed herein. Any of the feature values discussed herein may be included. For example, one feature value of the one or more feature values may include determining (706(A)) traffic flow data indicating speeds of one or more vehicles detected from the sensor data. This may include a speed of the stationary vehicle and/or speeds of other detected vehicles.

At operation 708, the example process 700 may include providing the one or more feature values to a machine-learning model, according to any of the techniques discussed herein.

At operation 710, the example process 700 may include outputting, by the machine-learning model, a probability that the stationary vehicle is a blocking vehicle, according to any of the techniques discussed herein.

At operation 712, the example process 700 may include controlling the vehicle based, at least in part, on the probability, according to any of the techniques discussed herein. For example, this may include controlling the vehicle to pass a blocking vehicle (712(A)) or controlling the vehicle to wait for a non-blocking vehicle (712(B)).

Example Clauses

A. An autonomous vehicle comprising: at least one sensor; a drive system to control physical operation of the autonomous vehicle; and a perception engine configured to perform operations comprising: receiving sensor data from the at least one sensor; detecting, based, at least in part, on the sensor data, a stationary vehicle in an environment of the autonomous vehicle; determining one or more feature values based, at least in part, on the sensor data, determine the one or more feature values including detecting, based, at least in part, on the sensor data, one or more other vehicles and speeds associated with the one or more other vehicles and the stationary vehicle, wherein the one or more feature values include a distribution of traffic flow data indicating a speed of the stationary vehicle and the speeds of the one or more other vehicles; providing, as input to a machine-learning model, the one or more feature values; receiving, from the machine-learning model, an indication that the stationary vehicle is a blocking vehicle or a non-blocking vehicle; and transmitting the indication to a planner, wherein the planner is configured to perform operations comprising: receiving the indication; and generating a trajectory for controlling motion of the autonomous vehicle.

B. The autonomous vehicle of paragraph A, wherein detecting the stationary vehicle includes: detecting existence of an object in an environment of the autonomous vehicle; classifying the object as a vehicle; determining a speed of the vehicle; and determining that the speed of the vehicle does not satisfy a predetermined threshold speed.

C. The autonomous vehicle of paragraph A or B, wherein detecting the stationary vehicle further includes detecting one or more other stationary vehicles within a predetermined threshold distance of the autonomous vehicle.

D. The autonomous vehicle of any of paragraphs A-C, wherein the one or more feature values further include at least a speed of the stationary vehicle and a traffic signal state.

E. The autonomous vehicle of any of paragraphs A-D, wherein the blocking vehicle is an object detected by the perception engine that obstructs at least one of the autonomous vehicle or another vehicle from making progress.

F. A computer-implemented method of controlling a vehicle comprising: receiving sensor data from one or more sensors of the vehicle; identifying a stationary vehicle based, at least in part, on the sensor data; determining one or more feature values based, at least in part, on the sensor data, one of the one or more feature values including traffic flow data indicating speeds of one or more vehicles detected from the sensor data; providing the one or more feature values to a machine-learning model; outputting, by the machine-learning model, a probability that the stationary vehicle is a blocking vehicle; and controlling the vehicle based, at least in part, on the probability, wherein controlling the vehicle comprises: controlling the vehicle to pass the blocking vehicle, or controlling the vehicle to wait for a non-blocking vehicle.

G. The autonomous vehicle of paragraph F, wherein the one or more feature values include at least one of: a speed of the stationary vehicle, a lane identification, a traffic signal state, a distance from the stationary vehicle to a next object in front of the stationary vehicle; a distance from the stationary vehicle to a next road junction, traffic flow data, a vehicle track indicating a movement taken by another vehicle with respect to the stationary vehicle, a sensor residual that indicates presence of an occluded object, a classification of at least one of the stationary vehicle or an object in the environment, a bounding box associated with the stationary vehicle; a state of a light of the stationary vehicle, an indication that a person is near the vehicle, a state of a door or aperture of the stationary vehicle, a size of the stationary vehicle, or a yaw of the stationary vehicle.

H. The autonomous vehicle of paragraph F or G, wherein the machine-learning model includes multiple decision trees configured to: receive the one or more feature values; push the one or more feature values through nodes of the decision trees to reach output nodes associated with weighted values; and sum the weighted values to determine the probability.

I. The computer-implemented method of any of paragraphs F-H, wherein the method further comprises detecting a stationary vehicle in an environment of the vehicle based, at least in part, on the sensor data.

J. The computer-implemented method of any of paragraphs F-I, wherein detecting the stationary vehicle includes: detecting existence of an object in an environment of the vehicle; classifying the object as a vehicle based; determining a speed of the vehicle based; and determining that the speed of the vehicle does not satisfy a predetermined threshold speed.

K. The computer-implemented method of any of paragraphs F-J, wherein the one or more feature values are indicative of one or more characteristics of at least one of the environment of the vehicle, the stationary vehicle, or an object in the environment.

L. The computer-implemented method of any of paragraphs F-K, wherein: outputting the probability is based, at least in part, on detecting the stationary vehicle; and the probability indicates a likelihood that the stationary vehicle is obstructing the vehicle.

M. The computer-implemented method of any of paragraphs F-L, wherein the one or more feature values include at least one of a speed of the stationary vehicle, a state of a light of signal indicator associated with the stationary vehicle, a distance to a next road junction, a speed of at least one other vehicle, a distance between the stationary vehicle and a next vehicle in front of the stationary vehicle, or a traffic signal state.

N. The computer-implemented method of any of paragraphs F-M, wherein the method further comprises: determining based, at least in part, on the traffic flow data that a speed of the stationary vehicle is anomalous compared to speed of two or more other vehicles detected by the perception engine; and indicating, as one of the one or more feature values, an indication that the speed of the stationary vehicle is anomalous.

O. A non-transitory computer-readable medium having a set of instructions that, when executed, cause one or more processors to perform operations comprising: one or more processors; memory having stored thereon a set of instructions that, when executed, cause the one or more processors to perform operations comprising: receiving sensor data from at least one sensor; detecting a stationary vehicle; receiving one or more feature values; transmitting, to a machine-learning model, the one or more feature values; receiving, from the machine-learning model, a probability that the stationary vehicle is a blocking vehicle; and transmitting the probability to a planner of an autonomous vehicle, the planner configured to control motion of the autonomous vehicle based, at least in part, on the probability.

P. The non-transitory computer-readable medium of paragraph P, wherein detecting the stationary vehicle comprises: detecting existence of an object in an environment proximate the autonomous vehicle; classifying the object as a vehicle; determining a speed of the vehicle; and determining that the speed of the vehicle does not satisfy a predetermined threshold speed.

Q. The non-transitory computer-readable medium of paragraph O or P, wherein detecting the stationary vehicle further includes determining that the vehicle impedes a trajectory previously determined by the autonomous vehicle.

R. The non-transitory computer-readable medium of any of paragraphs O-Q, wherein the operations further comprise: receiving a plurality of pairs of sample feature values and sample indications, an individual sample indication indicating a blocking vehicle or a non-blocking vehicle and the pairs being derived from sample sensor data; and training the machine-learning model from the plurality of pairs by: generating an input layer of nodes configured to receive the sample feature values; generating one or more hidden layers, the input layer of nodes configured to activate nodes of the one or more hidden layers; and generating an output layer configured to receive stimuli from nodes of the one or more hidden layers and to output the probability.

S. The non-transitory computer-readable medium of any of paragraphs O-R, wherein the one or more feature values include at least one of: a speed of the stationary vehicle, a traffic signal state, a distance from the stationary vehicle to a next object; a distance from the stationary vehicle to a next road junction, a lane identification, a bounding box of the stationary object, traffic flow data, a vehicle track indicating a movement taken by another vehicle with respect to the stationary vehicle, a sensor residual that indicates presence of an occluded object, a classification of at least one of the stationary vehicle or an object in the environment, a state of a light of the stationary vehicle, an indication that a person is near the vehicle, a state of a door or aperture of the stationary vehicle, a height of the stationary vehicle, or a yaw of the stationary vehicle.

T. The non-transitory computer-readable medium of any of paragraphs O-S, wherein the machine-learning model is one or more decision trees or a deep learning model.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously, in reverse order, with additional operations, or omitting operations, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method comprising:
   receiving sensor data associated with an environment associated with a vehicle;
   determining, based at least in part on the sensor data, an indication of traffic flow associated with an object within a portion of the environment, wherein the object is different than a stationary object;
   providing, as input to a machine-learning model, the indication;
   receiving, from the machine-learning model, a probability that the stationary object blocks a path of the vehicle or part of a roadway associated with the vehicle; and
   controlling the vehicle based at least in part on the probability.

2. The method of claim 1, wherein the indication of traffic flow comprises at least one of:
   a first distribution of at least one of actions, headings, or velocities of objects in the portion of the environment;
   a second distribution of at least one of actions, headings, or velocities of objects of a same classification in the portion of the environment;
   a tail characteristic of the first distribution or the second distribution;
   an indication of whether at least one of a heading or velocity associated with the stationary object is in a tail of the first distribution or the second distribution;
   a percent of objects having a same heading or velocity as the stationary object based at least in part on the first distribution or the second distribution;
   a percentile associated with a velocity of the stationary object based at least in part on the first distribution or the second distribution; or
   a frequency with which another object in the portion of the environment completes a type of action.

3. The method of claim 1, further comprising:
   determining, based at least in part on the sensor data, an object track associated with the object, wherein the object track comprises at least one of a current or historic heading and velocity of the object; and
   determining, based at least in part on the object track, that the object is currently or has been headed a same direction of travel as the vehicle, wherein:
   determining the indication of traffic flow is based at least in part on the object track and determining that the object is currently or has been headed the same direction of travel.

4. The method of claim 1, further comprising:
   determining, based at least in part on the sensor data, an object detection associated with the object, wherein the object detection comprises a classification associated with the object; and
   determining, based at least in part on two or more object detections indicating the classification, a distribution of an object track characteristic associated with the two or more object detections, wherein the object track characteristic comprises at least one of a current, historic, or predicted at least one of position, heading, or velocity indicated by object tracks associated with the two or more object detections,
wherein the distribution is part of the indication of traffic flow.

5. The method of claim 1, further comprising determining a weight associated with the indication of traffic flow based at least in part on a proximity of the object to the vehicle, wherein the weight is included in the indication of traffic flow.

6. The method of claim 1, further comprising:
controlling the vehicle to pass the stationary object based at least in part on determining that the probability meets or exceeds a threshold probability, or otherwise
controlling the vehicle to maintain a current action or come to a stop.

7. A system comprising:
one or more processors; and
a memory storing processor-executable instructions that, when executed by the one or more processors, cause the system to perform operations comprising:
receiving sensor data indicating an environment associated with a vehicle;
determining, based at least in part on the sensor data, an indication of movement of an object within a portion of the environment, wherein the object is different than a stationary object;
providing, as input to a machine-learning model, the indication;
receiving, from the machine-learning model, a probability that the stationary object blocks a path of the vehicle or at least part of a roadway associated with the vehicle; and
controlling the vehicle based at least in part on the probability.

8. The system of claim 7, wherein the portion of the environment comprises at least one of a first lane in which the vehicle is located or a second lane next to the first lane associated with an object track indicating that a second object moved in the second lane in a same direction of travel as the vehicle.

9. The system of claim 7, wherein the indication of movement comprises at least one of:
a first distribution of at least one of actions, headings, or velocities of objects in the portion of the environment;
a second distribution of at least one of actions, headings, or velocities of objects of a same classification in the portion of the environment;
a tail characteristic of the first distribution or the second distribution;
an indication of whether at least one of a heading or velocity associated with the stationary object is in a tail of the first distribution or the second distribution;
a percent of objects having a same heading or velocity as the stationary object based at least in part on the first distribution or the second distribution.

10. The system of claim 7, wherein the operations further comprise:
determining, based at least in part on the sensor data, an object track associated with the object, wherein the object track comprises at least one of a current or historic heading and velocity of the object; and
determining, based at least in part on the object track, that the object is currently or has been headed a same direction of travel as the vehicle, wherein:
determining the indication of movement is based at least in part on the object track and determining that the object is currently or has been headed the same direction of travel.

11. The system of claim 7, wherein the operations further comprise:
determining, based at least in part on the sensor data, an object detection associated with the object, wherein the object detection comprises a classification associated with the object; and
determining, based at least in part on two or more object detections indicating the classification, a distribution of an object track characteristic associated with the two or more object detections, wherein the object track characteristic comprises at least one of a current, historic, or predicted at least one of position, heading, or velocity indicated by object tracks associated with the two or more object detections,
wherein the distribution is part of the indication of movement.

12. The system of claim 7, wherein the operations further comprise determining a weight associated with the indication of traffic flow based at least in part on a proximity of the object to the vehicle, wherein the weight is included in the indication of traffic flow.

13. The system of claim 7, wherein the operations further comprise:
controlling the vehicle to pass the stationary object based at least in part on determining that the probability meets or exceeds a threshold probability, or otherwise
controlling the vehicle to maintain a current action or come to a stop.

14. A non-transitory computer-readable medium storing processor-executable instructions that, when executed by one or more processors, cause the one or more processors to perform operations comprising:
receiving sensor data indicating an environment associated with a vehicle;
determining, based at least in part on the sensor data, an indication of movement of an object within a portion of the environment, wherein the object is different than a stationary object;
providing, as input to a machine-learning model, the indication;
receiving, from the machine-learning model, a probability that the stationary object blocks a path of the vehicle or at least part of a roadway associated with the vehicle; and
controlling the vehicle based at least in part on the probability.

15. The non-transitory computer-readable medium of claim 14, wherein the portion of the environment comprises at least one of a first lane in which the vehicle is located or a second lane next to the first lane associated with an object track indicating that a second object moved in the second lane in a same direction of travel as the vehicle.

16. The non-transitory computer-readable medium of claim 14, wherein the indication of movement comprises at least one of:
a first distribution of at least one of actions, headings, or velocities of objects in the portion of the environment;
a second distribution of at least one of actions, headings, or velocities of objects of a same classification in the portion of the environment;
a tail characteristic of the first distribution or the second distribution;

an indication of whether at least one of a heading or velocity associated with the stationary object is in a tail of the first distribution or the second distribution;

a percent of objects having a same heading or velocity as the stationary object based at least in part on the first distribution or the second distribution.

17. The non-transitory computer-readable medium of claim 14, wherein the operations further comprise:

determining, based at least in part on the sensor data, an object track associated with the object, wherein the object track comprises at least one of a current or historic heading and velocity of the object; and determining, based at least in part on the object track, that the object is currently or has been headed a same direction of travel as the vehicle, wherein:

determining the indication of movement is based at least in part on the object track and determining that the object is currently or has been headed the same direction of travel.

18. The non-transitory computer-readable medium of claim 14, wherein the operations further comprise:

determining, based at least in part on the sensor data, an object detection associated with the object, wherein the object detection comprises a classification associated with the object; and determining, based at least in part on two or more object detections indicating the classification, a distribution of an object track characteristic associated with the two or more object detections, wherein the object track characteristic comprises at least one of a current, historic, or predicted at least one of position, heading, or velocity indicated by object tracks associated with the two or more object detections, wherein the distribution is part of the indication of movement.

19. The non-transitory computer-readable medium of claim 14, wherein the operations further comprise determining a weight associated with the indication of traffic flow based at least in part on a proximity of the object to the vehicle, wherein the weight is included in the indication of traffic flow.

20. The non-transitory computer-readable medium of claim 14, wherein the operations further comprise:

controlling the vehicle to pass the stationary object based at least in part on determining that the probability meets or exceeds a threshold probability, or otherwise controlling the vehicle to maintain a current action or come to a stop.

* * * * *